US012680853B2

(12) United States Patent
Patten et al.

(10) Patent No.: US 12,680,853 B2
(45) Date of Patent: Jul. 14, 2026

(54) ENHANCED SUPERCRITICAL FLUID MEASUREMENT WITH VIBRATORY SENSORS

(71) Applicant: MICRO MOTION, INC., Boulder, CO (US)

(72) Inventors: Andrew Timothy Patten, Boulder, CO (US); Anthony William Pankratz, Arvada, CO (US)

(73) Assignee: MICRO MOTION, INC., Boulder, CO (US)

( * ) Notice: Subject to any disclaimer, the term of this patent is extended or adjusted under 35 U.S.C. 154(b) by 998 days.

(21) Appl. No.: 17/770,544

(22) PCT Filed: Nov. 1, 2019

(86) PCT No.: PCT/US2019/059372
§ 371 (c)(1),
(2) Date: Apr. 20, 2022

(87) PCT Pub. No.: WO2021/086401
PCT Pub. Date: May 6, 2021

(65) Prior Publication Data
US 2022/0390262 A1     Dec. 8, 2022

(51) Int. Cl.
*G01F 1/86*     (2006.01)
*G01F 1/84*     (2006.01)
(Continued)

(52) U.S. Cl.
CPC .............. *G01F 1/86* (2013.01); *G01F 1/8436* (2013.01); *G01N 9/36* (2013.01); *G01N 29/024* (2013.01)

(58) Field of Classification Search
CPC ............ G01F 1/86; G01F 1/8436; G01F 1/74; G01N 9/36; G01N 29/024; G01N 29/4472
See application file for complete search history.

(56) References Cited

U.S. PATENT DOCUMENTS 4,262,523 A     4/1981  Stansfeld
4,754,650 A     7/1988  Smalling et al.
(Continued)

FOREIGN PATENT DOCUMENTS

CN     107850474 A     3/2018
CN     108603777 A     9/2018
(Continued)

OTHER PUBLICATIONS

Speed of Sound Calculator, Mera Calculator, Dec. 25, 2017, https://meracalculator.com/physics/classical/speed-of-sound.php.
(Continued)

*Primary Examiner* — Stephen D Meier
*Assistant Examiner* — Leo T Hinze
(74) *Attorney, Agent, or Firm* — The Ollila Law Group LLC

(57)     ABSTRACT
A method for inferring an inferred speed of sound of a flow fluid is disclosed. The method is conducted by a computer system (200) having a processor (210) and a memory (220), the processor (210) configured to execute instructions from the memory (220) and store data in the memory (220), the memory (220) having a SoS inference module (202). The method includes inferring, by the SoS inference module (202), the inferred speed of sound of the flow fluid based on an inferential relationship between a measured density of the flow fluid and the inferred speed of sound of the flow fluid.

20 Claims, 9 Drawing Sheets

(51) Int. Cl.
  G01N 9/36        (2006.01)
  G01N 29/024      (2006.01)

(56) References Cited

U.S. PATENT DOCUMENTS

| | | | |
|---|---|---|---|
| 6,202,494 | B1 | 3/2001 | Riebel et al. |
| 6,412,355 | B1 | 7/2002 | Haberli et al. |
| 7,581,453 | B2 | 9/2009 | Ao et al. |
| 9,429,545 | B2 | 8/2016 | Havira et al. |
| 2005/0061060 | A1 | 3/2005 | Gysling et al. |
| 2007/0125154 | A1 | 6/2007 | Gysling et al. |
| 2008/0034893 | A1 | 2/2008 | Stappert et al. |
| 2011/0125024 | A1 | 5/2011 | Mueller et al. |
| 2011/0264385 | A1 | 10/2011 | Weinstein et al. |
| 2016/0138951 | A1 | 5/2016 | Pretre |
| 2019/0072524 | A1 | 3/2019 | Loose et al. |
| 2021/0003491 | A1 | 1/2021 | Pfluger et al. |
| 2021/0172782 | A1* | 6/2021 | Gysling ................ G01F 1/8477 |

FOREIGN PATENT DOCUMENTS

| | | | |
|---|---|---|---|
| CN | 109298070 | A | 2/2019 |
| DE | 102016114972 | A1 * | 2/2018 |
| DE | 102017131267 | A1 | 6/2019 |
| EP | 1886098 | A2 | 2/2008 |
| JP | 2000337941 | A | 12/2000 |
| JP | 2004012169 | A | 1/2004 |
| JP | 2005315801 | A | 11/2005 |
| JP | 2007240220 | A | 9/2007 |
| JP | 2011045818 | A | 3/2011 |
| WO | 9807009 | A1 | 2/1998 |
| WO | 2003087735 | A1 | 10/2003 |
| WO | 2005012881 | A2 | 2/2005 |
| WO | 2007074055 | A1 | 7/2007 |

OTHER PUBLICATIONS

Internet Archive wayback machine, Dec. 25, 2017, https://web.archive.org/web/20171225152905/https://meracalculator.com/physics/classical/speed-of-sound.php, searched on May 21, 2024.

Takahashi, Eiichi, et al., Advanced Ignition technology for the achievement of high thermal efficiency of internal combustion engine, Synthesiology, Japan, National Institute of Advanced Industrial Science and Technology, Dec. 15, 2015, vol. 8, No. 4, pp. 190-199, https://doi.org/10.5571/synth.8.4_190.

Onsoku no keisan (Speed of sound calculation), Achapi no jitensha tukin (Achapi's commuting by bicycle), Japan, Feb. 20, 2013, https://achapi2718.blogspot.com/2013/02/blog-post_20.html.

J. Hemp, J. Kutin, Theory of errors in Coriolis flowmeter readings due to compressibility of the fluid being metered, Flow Measurement and Instrumentation vol. 17, Issue 6, (Dec. 2006) 359-369.

Powers, Joseph M: "Lecture Notes on Thermodynamics", Department of Aerospace and Mechanical Engineering, University of Notre Dame, Indiana 46556-5637 USA, Jan. 27, 2014, pp. 1-382, XP093229813, Retrieved from the Internet: URL:https://www.lip.pt/~jespada/teaching/data/TEM/LecturesNotesOnThermodynamics-Powers.pdf.

Hemp J et al: "Theory of errors in Coriolis flowmeter readings due to compressibility of the fluid being metered", Flow Measurement and Instrumentation, Butterworth-Heinemann, Oxford, GB, vol. 17, No. 6, Dec. 1, 2006, pp. 359-369, XP024961020, ISSN: 0955-5986, DOI: 10.1016/J.FLOWMEASINST.2006.07.006 [retrieved on Dec. 1, 2006].

T.C.Hebb; The Velocity of Sound and the Ratio of the Specific Heats for Air; Phys. Rev., vol. XX., No. 2, Feb. 1905; Phys. Rev., vol. 34, No. 4, p. 275, 1912; pp. 74-84; University of British Columbia, Vancouver, B.C.

* cited by examiner

700

Start

702 — RECEIVE THE INFERRED SPEED OF SOUND OF THE FLOW FLUID

704 — MEASURE A PHASE DIFFERENCE OR TIME DELAY

706 — DETERMINE A CORRECTED MASS FLOW PARAMETER BASED ON THE INFERRED SPEED OF SOUND OF THE FLOW FLUID

End

ENHANCED SUPERCRITICAL FLUID MEASUREMENT WITH VIBRATORY SENSORS

TECHNICAL FIELD

The embodiments described below relate to mass flow sensors, more particularly, to corrected mass flow sensors.

BACKGROUND

Several substances are best transferred at high temperature and/or pressure in a critical and/or supercritical phase condition (hereinafter, referred to as "supercritical"). An exemplary substance is Ethylene. For instance, when ethylene is used for feed-stock for plastic manufacturing processes, the ethylene is frequently pumped at high pressure in a critical phase condition. Supercritical phase ethylene has a higher density than gaseous ethylene, so its pumping costs are typically relatively low. Flow measurement determinations of ethylene are typically mass flowrate determinations.

Supercritical phase ethylene is particularly non-ideal, meaning that its density and velocity-of-sound properties change significantly with small changes in temperature and/or pressure. This makes flow measurement very difficult for all technologies, including Coriolis flow sensors. Supercritical phase ethylene is often transferred at pressures of 50 bar or higher. Temperature is typically about ambient temperature, perhaps about 20° C., but temperatures can vary depending on ground conditions, since the pipelines are often underground.

In the supercritical range, the density of ethylene (and other substances) varies dramatically with pressure and/or temperature changes. For instance, a 1 pound per square inch (hereinafter, "psi") change in pressure can cause a 2 kilogram per meter cubed (hereinafter, "kg/m$^3$") density change. Ideal gases show a significantly less pronounced change, for instance, a density change of less than 0.1 kg/m$^3$ for a 1 psi pressure change. Coriolis flow sensors are typically preferred for this reason. Small changes in pressure and/or temperature cause large density changes, which makes it challenging for determining mass flowrates using a combination of a density sensor and a volumetric flow sensor.

In addition to changes in density, speed of sound (hereinafter, "SoS") of ethylene (and other substances) also varies significantly with changes in pressure and/or temperature. For instance, a 1 psi change in pressure may cause a 5 meters per second (hereinafter, "m/s") SoS change, where the SoS of an ideal gas does not vary with pressure. Some Coriolis flow sensors, for instance, larger Coriolis flow sensors, are susceptible to SoS effects. Error on some of the larger Coriolis flow sensors is sufficiently high that it does not make sense to use them in applications with fluids in a critical state. The errors propagate from speed of sound effects being more pronounced in sensors with larger flow tube inner diameters and sensors that operate at higher frequencies. Speed of sound errors in mass flowrate determinations are higher when the speed of sound of the flow fluid is lower. For instance, the 1 psi change that can cause the 5 m/s SoS change can also cause a 0.03% change in a Coriolis flow sensor measurement. Pressure in typical pipelines can vary by 100 psi, perhaps causing a 3% error in flow measurements provided by the Coriolis sensor. A typical requirement for measurements is that there be less than 0.5% error. Many specifications state that the error should be less than 0.35%.

Mass flowrate equations and relationships that account for speed of sound can correct the mass flowrate for speed of sound effects. Many equations and relationships exist in the prior art to correct the mass flowrate using the speed of sound of the flow fluid. An example can be found in U.S. Pat. No. 6,412,355 B1. The mass flowrate correction methods of that patent are contemplated by this specification and are herein incorporated by reference, but it should be understood that these are merely exemplary and that other embodiments of mass flowrate correction algorithms that account for speed of sound exist and may be used with the features of this disclosure. These equations and relationships can make larger Coriolis flow sensors useful in more applications where speed of sound effects are significant.

Accordingly, there is a need for methods to correct for speed of sound effects in Coriolis flow sensors.

SUMMARY

Embodiments of methods for inferring an inferred speed of sound of a flow fluid are disclosed. The methods are conducted by a computer system (200) having a processor (210) and a memory (220), the processor (210) configured to execute instructions from the memory (220) and store data in the memory (220), the memory (220) having a SoS inference module (202). The methods include inferring, by the SoS inference module (202), the inferred speed of sound of the flow fluid based on an inferential relationship between a measured density of the flow fluid and the inferred speed of sound of the flow fluid.

Embodiments of an apparatus for inferring an inferred speed of sound of a flow fluid are disclosed. The apparatus has a computer system (200), the computer system (200) having a processor (210) and a memory (220), the processor (210) configured to execute instructions from the memory (220) and store data in the memory (220), the memory (220) having a SoS inference module (202). The SoS inference module (202) is configured to infer, by the SoS inference module (202), the inferred speed of sound of the flow fluid based on an inferential relationship between a measured density of the flow fluid and the inferred speed of sound of the flow fluid.

ASPECTS

According to an aspect, a method for inferring an inferred speed of sound of a flow fluid is disclosed. The method is conducted by a computer system (200) having a processor (210) and a memory (220), the processor (210) configured to execute instructions from the memory (220) and store data in the memory (220), the memory (220) having a SoS inference module (202). The method includes inferring, by the SoS inference module (202), the inferred speed of sound of the flow fluid based on an inferential relationship between a measured density of the flow fluid and the inferred speed of sound of the flow fluid.

Preferably, the inferential relationship between the inferred speed of sound of the flow fluid and the density of the flow fluid is an inverse relationship between the inferred speed of sound of the flow fluid and the square root of the measured density of the flow fluid.

Preferably, the inferential relationship between the inferred speed of sound of the flow fluid and the density of the flow fluid further accounts for a pressure of the flow fluid, wherein the pressure of the flow fluid is one or more of a measured pressure measured by a pressure sensor (20) and a pressure inferred from a density sensor (10) stiffness determination.

Preferably, the inferential relationship is further based on a relationship between the inferred speed of sound of the flow fluid and a heat capacity ratio of the flow fluid, wherein the inferential relationship is based on a relationship between the inferred speed of sound of the flow fluid and a square root term, the square root term having a square root of a product of the heat capacity ratio and the pressure divided by the square root of the measured density.

Preferably, the heat capacity ratio is associated with one or more of the flow fluid and a class of flow fluids of which the flow fluid is a member and wherein the heat capacity ratio is one or more of temperature dependent and pressure dependent, such that the heat capacity ratio is determined based on a corresponding predetermined relationship between the heat capacity ratio and one or more of the measured temperature and the pressure.

Preferably, the computer system (200) is a density sensor meter electronics (120) of a density sensor (10), the method further comprising measuring, by the density sensor (10), the measured density, and transmitting, by the density sensor (10) the inferred speed of sound of the fluid to a vibratory sensor (5).

Preferably, the method further comprises, if the inferential relationship between a measured density of the flow fluid and the inferred speed of sound of the flow fluid accounts for a flow fluid pressure, inferring, by the density sensor meter electronics (120), an inferred flow fluid pressure based on a measured stiffness of elements of the density sensor (10) determined by the density sensor (10).

Preferably, the computer system (200) is a vibratory flow sensor meter electronics (110) of a vibratory flow sensor (5), the method further comprising receiving, by the computer system (200), the measured density from a density sensor (10), receiving, by the computer system (200), the pressure of the flow fluid, and determining, by the computer system (200), a corrected mass flowrate, based on the inferred speed of sound of the flow fluid.

Preferably, the vibratory sensor (5) one or more of vibrates vibratory sensor (5) vibratory elements at a frequency that is greater than or equal to 300 hertz and has an inner diameter that is greater than or equal to two inches, and the density sensor (10) one or more of vibrates density sensor (10) vibratory elements at a frequency that is less than 300 hertz and has an inner diameter that is less than two inches.

Preferably, the flow fluid is in a supercritical state and comprises one or more of ethylene, ethane, carbon dioxide, and argon.

According to an aspect, an apparatus for inferring an inferred speed of sound of a flow fluid is disclosed. The apparatus has a computer system (200), the computer system (200) having a processor (210) and a memory (220), the processor (210) configured to execute instructions from the memory (220) and store data in the memory (220), the memory (220) having a SoS inference module (202). The computer system (200) is configured to infer, by the SoS inference module (202), the inferred speed of sound of the flow fluid based on an inferential relationship between a measured density of the flow fluid and the inferred speed of sound of the flow fluid.

Preferably, the inferential relationship between the inferred speed of sound of the flow fluid and the density of the flow fluid is an inverse relationship between the inferred speed of sound of the flow fluid and the square root of the measured density of the flow fluid.

Preferably, the inferential relationship between the inferred speed of sound of the flow fluid and the density of the flow fluid further accounts for a pressure of the flow fluid, wherein the pressure of the flow fluid is one or more of a measured pressure measured by a pressure sensor (20) and a pressure inferred from a density sensor (10) stiffness determination.

Preferably, the inferential relationship is further based on a relationship between the inferred speed of sound of the flow fluid and a heat capacity ratio of the flow fluid, wherein the inferential relationship is based on a relationship between the inferred speed of sound of the flow fluid and a square root term, the square root term having a square root of a product of the heat capacity ratio and the pressure divided by the square root of the measured density.

Preferably, the heat capacity ratio is associated with one or more of the flow fluid and a class of flow fluids of which the flow fluid is a member and wherein the heat capacity ratio is one or more of temperature dependent and pressure dependent, such that the heat capacity ratio is determined based on a corresponding predetermined relationship between the heat capacity ratio and one or more of the measured temperature and the pressure.

Preferably, the computer system (200) is a density sensor meter electronics (120) of a density sensor (10), the density sensor (10) configured to measure the measured density and transmit the inferred speed of sound of the fluid to a vibratory sensor (5).

Preferably, if the inferential relationship between a measured density of the flow fluid and the inferred speed of sound of the flow fluid accounts for a flow fluid pressure, the density sensor meter electronics (120) is configured to infer an inferred flow fluid pressure based on a measured stiffness of elements of the density sensor (10) determined by the density sensor (10).

Preferably, the apparatus is a vibratory flow sensor (5), the computer system (200) is a vibratory flow sensor meter electronics (110) of the vibratory flow sensor (5). The computer system (200) is further configured to receive the measured density from a density sensor (10), receive the pressure of the flow fluid, and determine a corrected mass flowrate based on the inferred speed of sound of the flow fluid.

Preferably, the vibratory sensor (5) one or more of vibrates vibratory sensor (5) vibratory elements at a frequency that is greater than or equal to 300 hertz and has an inner diameter that is greater than or equal to two inches, and the density sensor (10) one or more of vibrates density sensor (10) vibratory elements at a frequency that is less than 300 hertz and has an inner diameter that is less than two inches.

Preferably, the flow fluid is in a supercritical state and comprises one or more of ethylene, ethane, carbon dioxide, and argon.

BRIEF DESCRIPTION OF THE DRAWINGS

The same reference numbers represent embodiments of the same element in all drawings. It should be understood that the drawings are not necessarily to scale.

5

Figure 3:
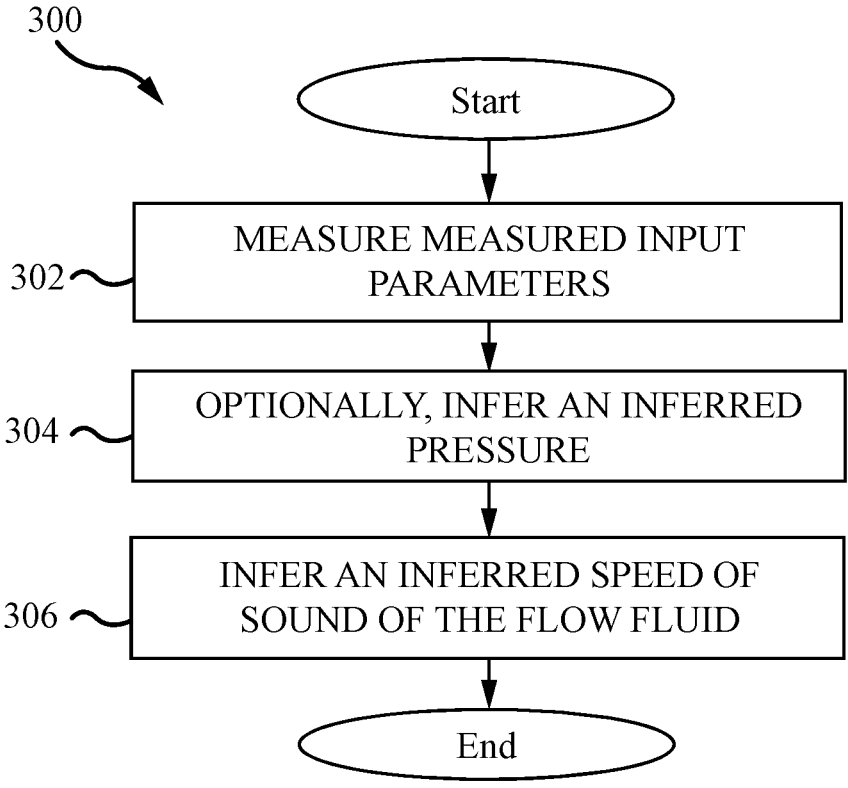

FIG. 3 shows a flowchart of an embodiment of a method 300 for inferring an inferred speed of sound of a flow fluid.

Figure 4:
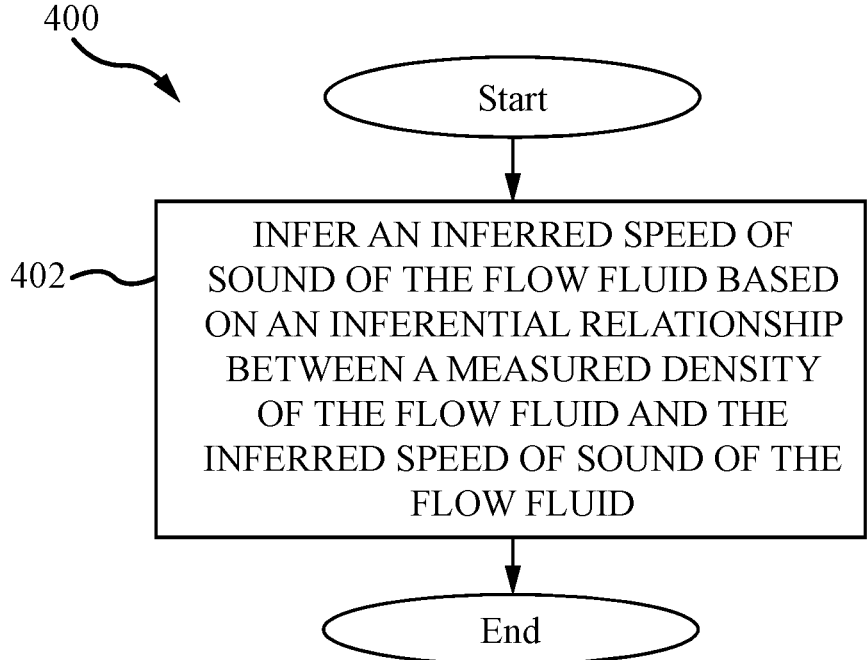

FIG. 4 shows a flowchart of an embodiment of a method 400 for inferring an inferred speed of sound of a flow fluid.

Figure 5:
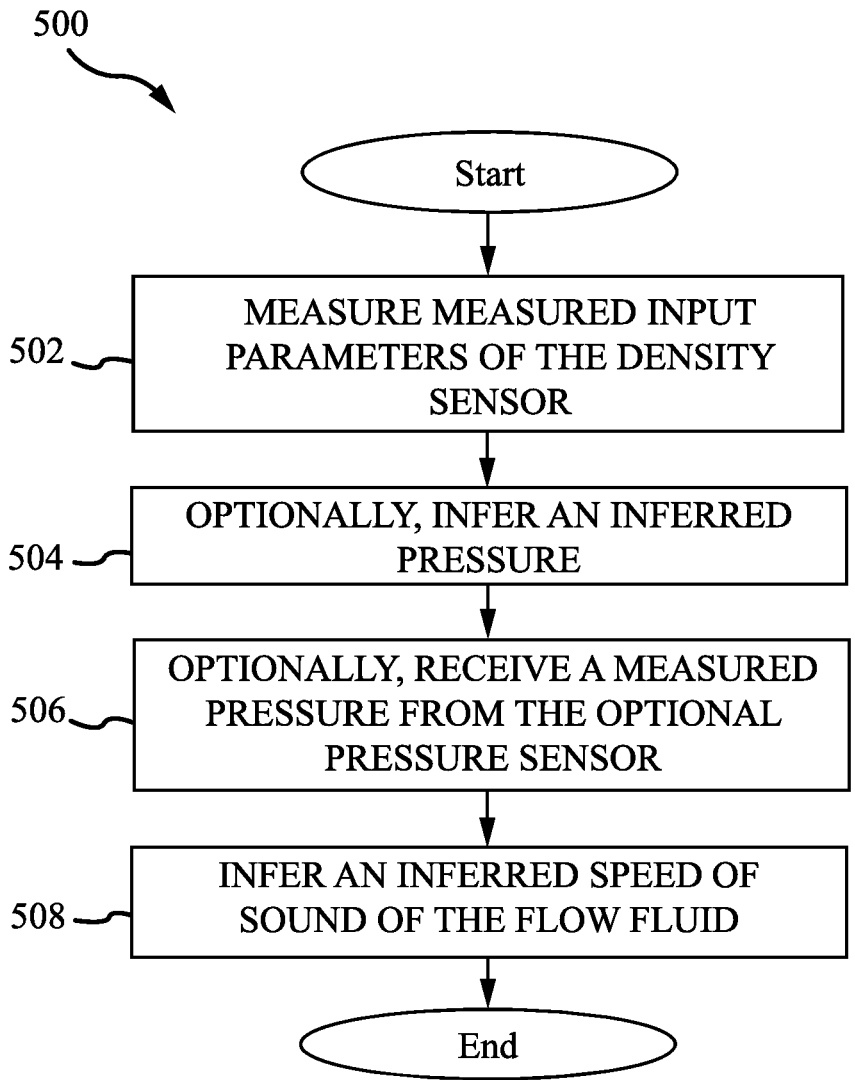

FIG. 5 shows a flowchart of an embodiment of a method 500 for inferring an inferred speed of sound of a flow fluid in a density sensor 10.

Figure 6:
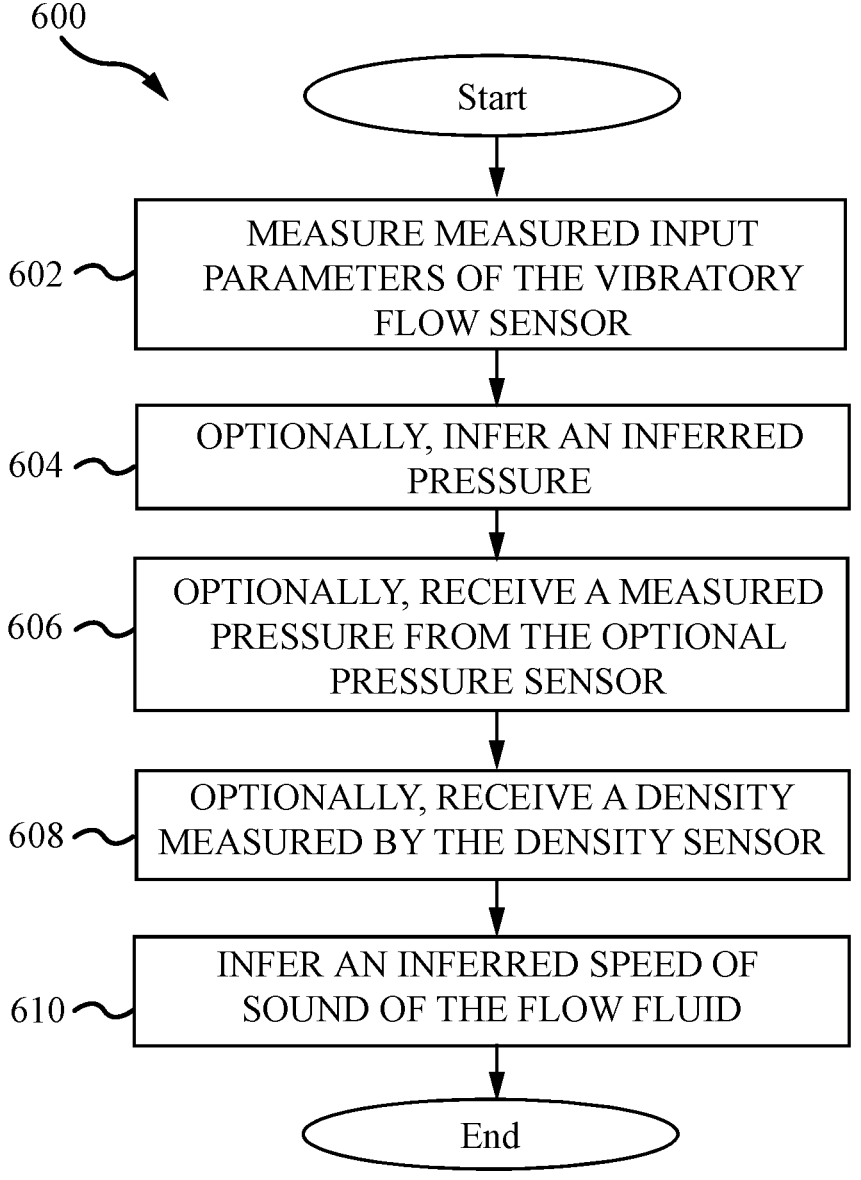

FIG. 6 shows a flowchart of an embodiment of a method 600 for inferring an inferred speed of sound of a flow fluid in a vibratory flow sensor 5.

Figure 7:
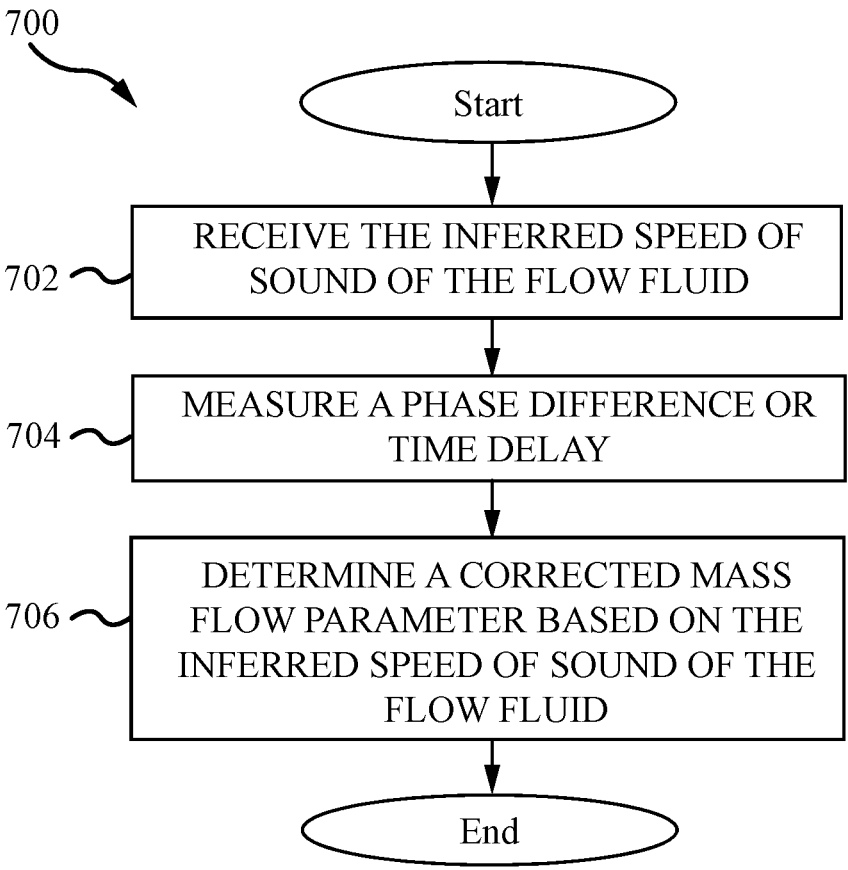

FIG. 7 shows a flowchart of an embodiment of a method 700 for correcting a flow measurement using an inferred speed of sound.

Figure 8:
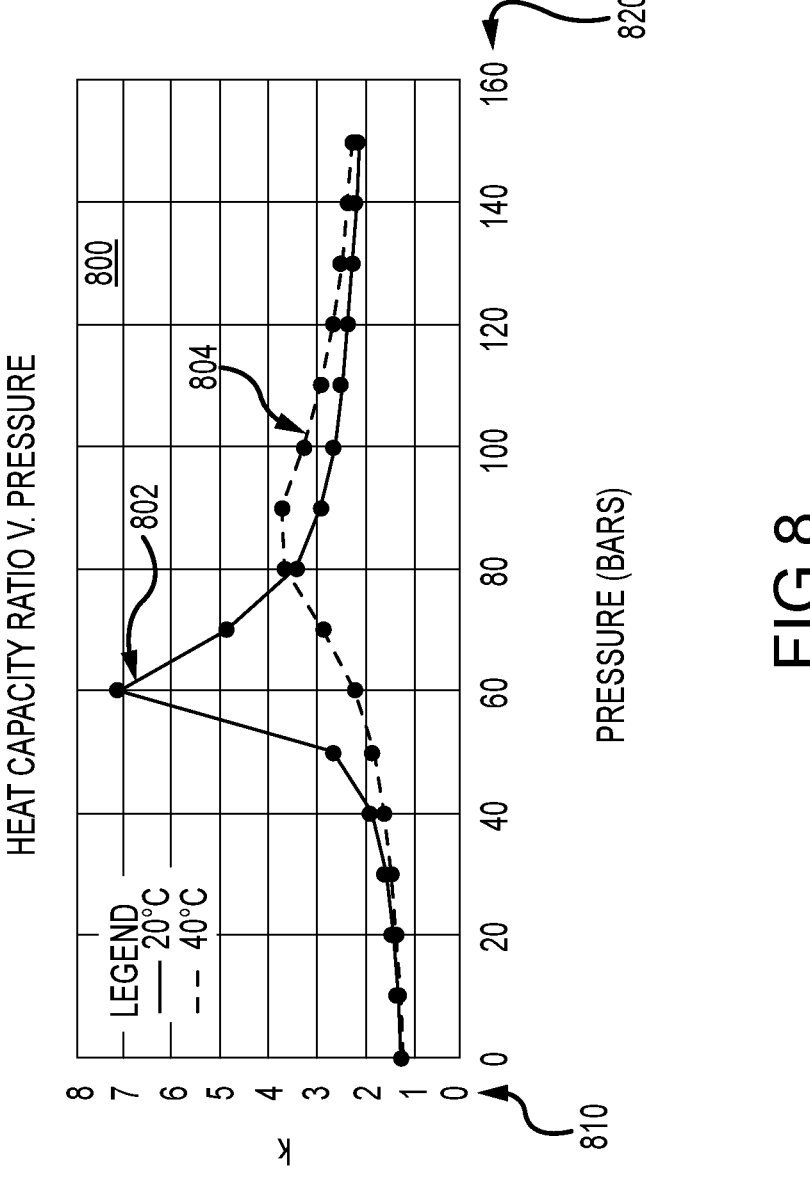

FIG. 8 shows a graph 800 showing an embodiment of the relationship between heat capacity ratio with both of pressure and temperature for ethylene.

Figure 9:
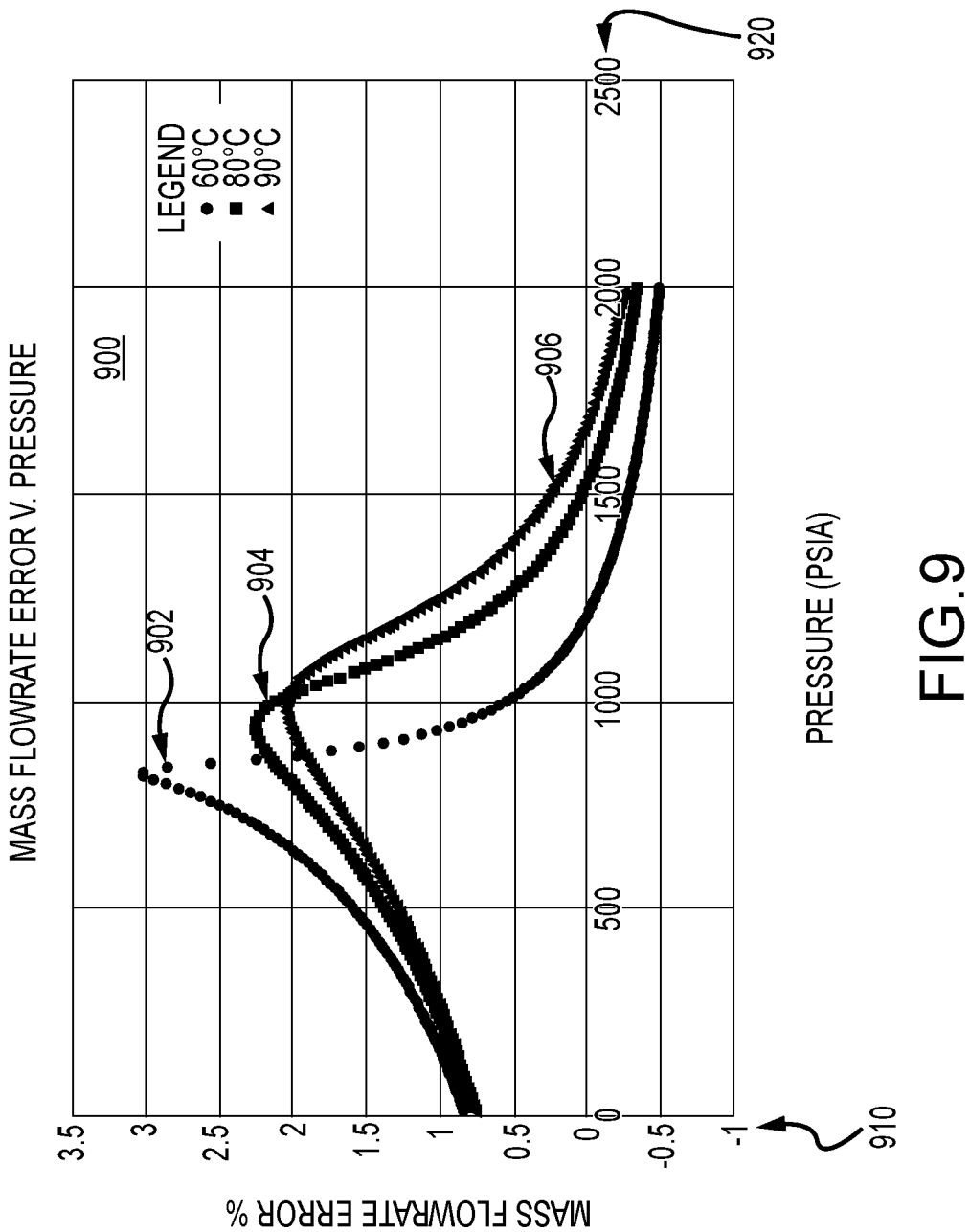

FIG. 9 shows a graph 900 showing an embodiment of the relationship between mass flowrate error percent due to speed of sound effects and both of pressure and temperature for ethylene flowing through a CMF400 mass flowmeter.

DETAILED DESCRIPTION

FIGS. 1-9 and the following description depict specific examples to teach those skilled in the art how to make and use the best mode of embodiments of systems and methods for enhanced supercritical fluid measurements with vibratory sensors. For the purpose of teaching inventive principles, some conventional aspects have been simplified or omitted. Those skilled in the art will appreciate variations of these examples that fall within the scope of the present description. Those skilled in the art will appreciate that the features described below can be combined in various ways to form multiple variations of systems and methods for enhanced supercritical fluid measurements with vibratory sensors. As a result, the embodiments described below are not limited to the specific examples described below.

Figure 1:
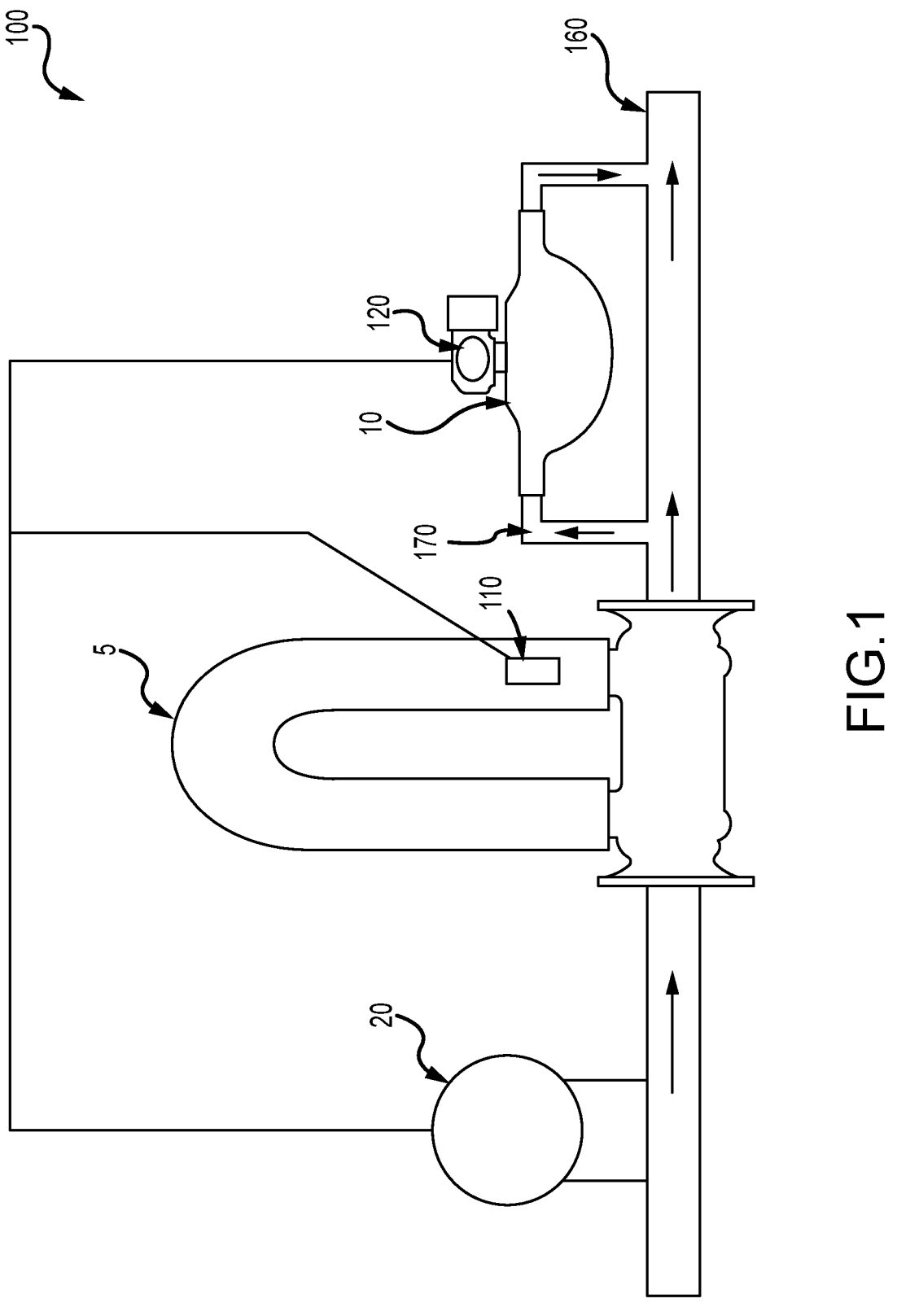
FIG. 1 shows a system 100 for providing correct flow sensor measurements.

FIG. 1 shows a system 100 for providing correct flow sensor measurements.

The system 100 may use inferential determinations to correct flow measurements in a Coriolis flow meter that may be affected by SoS effects. When the terms "infer" or "inferring" are used in verb form, it should be understood that this means to determine using inferential associations, for instance, using inferential relationships. In an embodiment, the system 100 may infer a SoS of a fluid. The SoS of a flow fluid may be inferred from measurements of one or more of pressure, density, and/or temperature of the flow fluid. The SoS inference may capitalize on a relationship between specific heat ratio of the flow fluid and one or more of temperature and pressure (hereinafter, "a temperature and/or pressure dependent heat capacity ratio"). The heat capacity ratio, denoted symbolically as "k" in this specification, is the ratio of the specific heat at constant pressure (typically denoted by $C_p$) to the specific heat at a constant volume (typically denoted by $C_v$).

The hardware used in system 100 may vary in different embodiments. A corrected mass flow rate may be determined by a Coriolis flow sensor, using methods known in the art. The Coriolis flow sensor, especially if it is a larger Coriolis flow sensor, may be susceptible to SoS effects. The SoS effects may cause error in the mass flowrate determined by the Coriolis flow sensor. The SoS effects can be accounted for if the SoS of the flow fluid is known. However, the Coriolis flow sensor, because it is sensitive to SoS effects, may not be trusted to yield one or more measurements that can be used to infer the SoS of the flow fluid.

The flow fluids contemplated may be ones that are commonly transported or used in a supercritical fluid state. Examples of flow fluids contemplated by this specification are, for instance, one or more of ethylene, ethane, carbon dioxide, and argon.

In an embodiment, another sensor is used to provide flow fluid measurements that can be used to correct a mass flowrate measured by a Coriolis flow sensor for SoS effects. For instance, a density meter or a viscosity meter may be used to determine measurements to be used in an inference of the SoS of the flow fluid. In an embodiment, a pressure sensor may be used to determine a measured pressure for an inference of the SoS of the flow fluid. In an alternative embodiment, the pressure may be inferred from other measurements. For instance, a density sensor 10 may measure stiffness of the density sensor 10 and may infer the pressure of the flow fluid from the measured stiffness. In an embodiment, the stiffness may have a linear relationship with the inferred pressure, with a simple slope and intercept. In an embodiment, the inferred pressure may be inferred using the relationship represented by Eq. (13).

In an embodiment, the SoS of the flow fluid may be determined from one or more of a measured density, measured temperature, measured or inferred pressure, and a temperature and/or pressure dependent specific heat ratio. The relationship may be derived from an ideal gas law equation that is modified to account for super-compressibility.

$$P \times V = z \times R \times T \qquad (1)$$

Rearranging:

$$\text{density} = \frac{1}{V} = \frac{P}{z \times R \times T} \qquad (2)$$

In Eqs. (1) and (2), P is the pressure of the flow fluid, V is the volume of the flow fluid, z is the compressibility of the flow fluid, R is the universal gas constant (as a function of molecular weight (hereinafter, "MW")), and T is absolute temperature of the flow fluid. Because the gas constant is a function of MW, the density equation of Eq. (2) can be rewritten as Eq. (3):

$$\text{density} = \rho = \frac{1}{V} = \frac{P \times (MW)}{z \times R \times T} \qquad (3)$$

In Eq. (3), p is the density of the flow fluid.

Eq. (3) can be further rearranged to yield Eq. (4) to be used later:

$$\frac{z}{MW} = \frac{P}{\rho \times R \times T} \qquad (4)$$

The SoS of a fluid, "a," is a function of the change of pressure vs. the change of density, as shown in Eq. (5):

$$a = \sqrt{\frac{\partial P}{\partial \rho}} \qquad (5)$$

Assuming the SoS is isentropic in the system, Eq. (5) can be expanded to Eq. (6):

$$a = \sqrt{\frac{k \times R \times T}{MW}} \tag{6}$$

In Eq. (6), k is the specific heat ratio for a gas and is a function of temperature and/or pressure. Equation (6) can be modified to account for the effects of the non-ideal gas behavior, as was done to Eq. (1), to yield Eq. (7):

$$a = \sqrt{\frac{k \times R \times T \times z}{MW}} \tag{7}$$

Combining Eqs. (4) and (7) yields Eq. (8):

$$a = \sqrt{\frac{k \times P}{\rho}} \tag{8}$$

In an embodiment, k is a function of temperature and/or pressure and can be expressed as k(T,P) (or, alternatively as k(P) or k(T)). Eq. (8) can be rewritten as Eq. (9) to represent this.

$$a = \sqrt{\frac{k(T, P) \times P}{\rho}} \tag{9}$$

Eqs. (5)-(9) represent relationships where SoS is inferred from values of one or more of flow fluid pressure, density, and temperature. Inferring the SoS may be more practical, as the inferential relationship can use measurements typically taken in existing systems for transferring, transporting, and/or storing supercritical fluids.

It can be seen that the relationship in Eqs. (8) and/or (9) have certain relationships between parameters that differentiate the inferential determination of Eqs. (8) and/or (9) from existing SoS determining methods. For instance, the SoS may be inferred based on an inverse relationship between the SoS and the density of the flow fluid. Further, the SoS may be inferred based on a direct relationship between the SoS and the pressure of the flow fluid. The SoS may be inferred based on a direct relationship between the square root of the pressure and the SoS of the flow fluid. The SoS may be inferred based on an inverse relationship between the SoS and the square root of the density of the flow fluid. The SoS may be inferred based on a direct relationship between the SoS and the product of the heat capacity ratio (k) and the pressure of the flow fluid. The SoS may be inferred based on a direct relationship between the SoS and the product of a temperature and/or pressure dependent heat capacity ratio (k(T), k(P), and/or k(T,P)) and the pressure of the flow fluid. The SoS may be inferred based on a direct relationship between the SoS and a ratio of the pressure to the density of the flow fluid. The SoS may be inferred based on a direct relationship between the SoS and a square root of the ratio of the pressure to the density of the flow fluid. The SoS may be inferred based on a direct relationship between the SoS and a square root of the product of the heat capacity ratio (perhaps a temperature and/or pressure dependent heat capacity ratio) and the ratio of the pressure to the density of the flow fluid.

In order to evaluate the heat capacity ratio based on temperature and/or pressure, the computer system 200 that makes the inferential determination may have stored a predetermined relationship, perhaps with substance specific constants to determine the heat capacity ratio. In an alternative embodiment, the computer system 200 has substance specific tables that show the heat capacity ratio at particular temperature and/or pressure values, the computer system 200 perhaps interpolating or extrapolating a heat capacity ratio from the table values or taking the closest heat capacity table value if no exact value of heat capacity ratio is stored for the relevant temperature and/or pressure values.

The system 100 may have a vibratory flow sensor 5, a density sensor 10, an optional pressure sensor 20, a conduit 160, and a side stream 170. In an embodiment one or more of the vibratory flow sensor 5, the density sensor 10 and the optional pressure sensor 20 may be communicatively coupled, perhaps at their respective computers and/or meter electronics. The vibratory flow sensor 5 may be used to determine various flow fluid and/or fluid flow measurements, for instance, one or more of a mass flowrate, a density, and a viscosity.

Vibratory flow sensor 5 is a vibratory flow sensor that detects fluid flow and/or flow fluid properties. In an embodiment, the vibratory flow sensor 5 is a Coriolis flow sensor. Vibratory sensors, such as Coriolis mass flowmeters and vibrating densitometers and viscosmeters, typically operate by detecting motion of a vibrating conduit that contains a flowing material or vibrating elements immersed in a fluid. Properties associated with the material in the conduit, such as mass flow, density and the like, can be determined by processing the measurement signals received from the motion transducers associated with the conduit. The vibration modes of the vibrating material-filled system generally are affected by the mass, stiffness, and damping characteristics of the fluid containing conduit and the material contained therein.

A typical Coriolis mass flowmeter includes one or more conduits, or flow tubes, that are connected inline in a pipeline (e.g. the conduit 160 or the side stream 170) or other transport system and convey material, for instance, fluids, slurries, emulsions, and the like, in the system 100. Each conduit may be viewed as having a set of natural vibration modes, including, for example, simple bending, torsional, radial, and coupled modes. In a typical Coriolis mass flow measurement application, a conduit is excited in a vibration mode as a material flows through the conduit, and motion of the conduit is measured at points spaced along the conduit. Excitation is typically provided by an actuator, for instance, an electromechanical device, such as a magnet and coil-type driver, that perturb the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits and are typically located at positions both upstream and downstream of the actuator. The pickoffs may yield signals that are out of phase with one another, and the phase difference or time delay between the signals may be representative of the Coriolis forces affecting the vibrations of the conduits. The two pickoff sensors are connected to electronic instrumentation. The instrumentation receives signals from the two pickoff sensors and processes the signals in order to derive a mass flow rate measurement or a density measurement, among other things. For purposes of this specification, the instrumentation described will be designated the vibratory flow sensor meter electronics 110. Other flowmeter arrangements are contemplated, for instance, systems in which only one pickoff is used or where the driver also has a pickoff mode such that only a single driver is used to determine the phase difference.

Mass flow rate (ṁ) generated by a flowmeter, using the vibratory flow sensor meter electronics 110, may be determined using Eq. (10):

$$\dot{m} = FCF \times [\Delta t - \Delta t_0] \qquad (10)$$

In Eq. (10), FCF is a flow calibration factor, $\Delta t$ is a time delay, and $\Delta t_0$ is a time delay zero-offset. Embodiments in which a phase difference is used instead of a time delay are common in the art and are contemplated, but these examples, for purposes of brevity, are not presented.

Mass flowrate can be corrected for speed of sound effects, using the vibratory flow sensor meter electronics. An example of relationships that can be used to correct mass flowrate for speed of sound can be found in Eqs. (11) and (12):

$$x_{error} = b + c \times (a) + d \times (a^2) + e \times (a^3) + f \times (a^4) \qquad (11)$$

$$\dot{m}_{corrected} = [\dot{m}_{uncorrected}] \times [1 - x_{error}] \qquad (12)$$

In Eq. (11), $x_{error}$ is a mass flowrate error factor which is dependent upon a relationship with the speed of sound, "a." In various embodiments, the relationship may be a polynomial in speed of sound. For each power of speed of sound, there is a corresponding coefficient (e.g. b, c, d, e, and f), these corresponding coefficients being associated with the fluid (perhaps by the meter electronics, with the meter electronics making the mass flow correction, storing these coefficients, and associating them with a specific fluid to be used for correcting mass flowrate of that fluid, perhaps being associated with the relevant k values for the fluid). In an alternative embodiment, there can be coefficients that are not dependent upon the fluid, but, rather, are dependent upon the flow sensor being used, such that only one set of coefficients exists for all types of flow fluids. Combinations of these embodiments are contemplated, for instance, embodiments in which associations are made between the coefficients and both of the flow fluid and the fluid sensor. Although depicted as a fourth order polynomial, other relationships including different orders of polynomial are contemplated. Other orders of polynomial may be, for instance, first, second, third, fifth, sixth, seventh, and/or the like. In Eq. (12), $\dot{m}_{uncorrected}$ is a mass flowrate measured by a flow sensor 5 that is not corrected for speed of sound effects, and $\dot{m}_{corrected}$ is a mass flowrate corrected for speed of sound effects. It should be appreciated that the uncorrected mass flowrate, $\dot{m}_{uncorrected}$, may be determined using any known relationship, for instance, Eq. (10) (with ṁ of Eq. (10) being $\dot{m}_{uncorrected}$ of Eq. (12)). In Eq. (12), $\dot{m}_{corrected}$ is a mass flowrate corrected for speed of sound effects. Using the relationships in Eqs. (1)-(9) to infer a speed of sound and using Eqs. (10)-(12) to correct a measured mass flowrate can create an effective system for correcting measured mass flowrates for speed of sound effects. In other embodiments, instead of a mass flowrate error factor, a magnitude of mass flowrate error may be determined, such that a corrected mass flowrate could be the sum of or difference between an uncorrected mass flowrate and the magnitude of mass flowrate error.

Speed of sound effects may be considered significant in larger vibratory sensors, for instance sensors with an inner diameter of 2 inches or greater. Speed of sound effects may also be considered significant in vibratory sensors that vibrate at higher frequencies, for instance, frequencies at or above 300 hertz.

In an embodiment, the vibratory flow sensor 5 may have a sufficiently large inner diameter and/or vibrate at a sufficiently high frequency such that the vibratory flow sensor 5 is susceptible to SoS effects, and measurements taken by the vibratory flow sensor 5 may have associated SoS related errors. Relationships that correct mass flowrate may be used with a SoS measurement or inference to determine the SoS effect on mass flow measurements the vibratory flow sensor 5 produces.

The vibratory flow sensor 5 may be coupled to and/or in fluid communication with a conduit 160. The conduit is a hollow member, perhaps substantially cylindrical, through which a flow fluid flows. The vibratory flow sensor 5 may be embedded in the conduit 160 and/or may be fluidly coupled in series to the fluid flow from the conduit 160.

If the vibratory flow sensor 5 is the kind that is susceptible to SoS effects, a further density sensor 10 may be used to determine measurements that are largely immune to the SoS effects to determine or infer the SoS for correcting the mass flowrate measured by the vibratory flow sensor 5. The density sensor 10 is a sensor that determines the density of a flow fluid. A vibratory flow sensor 5 may be considered a kind that is susceptible to SoS effects if its inner diameter is high and/or its vibratory frequency is high. For instance, the vibratory flow sensor 5 may have an inner diameter that is equal to or greater than two inches and/or the vibratory flow sensor 5 may vibrate vibratory elements at a frequency that is equal to or greater than 300 hertz. The density sensor 10 may make determinations and inferences and may measure using the logic stored in a density sensor meter electronics 120. The density sensor 10 may also be a Coriolis flow sensor, perhaps a flow sensor that vibrates at a lower frequency and/or has a lower flow tube inner diameter than the vibratory flow sensor 5. To that extent, the density sensor 10 may also be a vibratory flow sensor that is different from the vibratory flow sensor 5. In an embodiment, the density sensor may be one of a Coriolis density meter and a Coriolis flow meter. Embodiments in which the density sensor 10 is a fork density meter or a fork viscosity meter are contemplated, but it should be noted that these are high frequency meters that have significant SoS effects and correct for the SoS effects using empirical corrections with associated errors that propagate to subsequent determinations. Embodiments in which the density sensor 10 is a gas density meter (GDM) are contemplated, but it should be noted that these operate at high frequency and have associated SoS effect errors that require in situ calibration, perhaps making the density and other determinations more susceptible to error and more difficult to facilitate.

In an embodiment, the density sensor 10 has a smaller diameter and/or a lower vibrating frequency than the vibratory flow sensor 5. For instance, the inner diameter of the density sensor 10 may be less than two inches and/or the density sensor may vibrate at a frequency lower than 300 hertz. The density sensor 10 may be able to measure a density that is substantially immune to speed of sound effects, perhaps within a predetermined tolerance. The measurement of density by the density sensor 10 may be conducted by methods well established in the art, for instance, relationships based on the frequency of vibration of the density sensor 10 and the density of the material that flows within the density sensor 10. The density sensor 10 may be placed upstream or downstream (with respect to the direction of fluid flow) of the vibratory flow sensor 5. In another embodiment, if the density sensor 10 is of a smaller diameter than the vibratory flow sensor 5, the density sensor 10 may be in fluid communication with the vibratory flow sensor 5 via a side stream 170 (as shown in FIG. 1). The side stream 170 is an offshoot from a conduit 160 that is in fluid communication with the conduit 160 but, perhaps, has an inner diameter (effective flow diameter and/or effective flow cross section) different from the inner diameter of the conduit 160. Alternatively, the density sensor 10 may be in direct fluid communication with the conduit 160. It may be preferential that the vibratory flow sensor 5 be within a certain distance threshold of the density sensor 10, such that the measurements of the vibratory flow sensor 5 and the density sensor 10 largely correspond to one another and represent the same flowing fluid. The density sensor 10 may have a computer, perhaps a density sensor meter electronics 120, that is in electronic communication with the vibratory flow sensor 5. In an embodiment where an inferred pressure is used (as opposed to a measured pressure), one of the density sensor 10 and the vibratory flow sensor 5 may infer a pressure of the flow fluid from relationships between the pressure and the stiffness of the density sensor 10. In an embodiment, the density sensor 10 may infer the pressure using density sensor meter electronics 120 of the density sensor 10. In another embodiment, the relevant stiffness value or relationship is transmitted to the vibratory flow sensor meter electronics 110 from the density sensor 10, such that the vibratory flow sensor 5 infers the pressure of the flow fluid from the stiffness of the density sensor 10. Any measurements or inferences, perhaps including one or more of a measured density, measured stiffness, and an inferred pressure, may be transmitted from the density sensor 10 to a meter electronics of the vibratory flow sensor 5 in order to be used in an inference of SoS and/or to determine an SoS corrected mass flowrate. The density sensor 10 may infer one or more of the pressure and speed of sound of the flow fluid and transmit one or more of those inferred quantities to the vibratory flow sensor meter electronics 110.

In the embodiment where the pressure is inferred (as opposed to measured), if the pressure inference is conducted by the density sensor 10, the density sensor 10 may be able to infer, by the density sensor meter electronics 120, an inferred speed of sound, perhaps by evaluating one of the relationships in Eq. (8) or Eq. (9) using the inferred pressure and, perhaps, one or more of measured density and a measured temperature (the temperature and/or pressure used to determine the heat capacity ratio, k).

In an embodiment where a measured pressure is used (as opposed to an inferred pressure), the system 100 may have a further optional pressure sensor 20. The optional pressure sensor 20 is a sensor that measures pressure of a flow fluid. The pressure sensor 20 may be any pressure sensor known in the art. The pressure sensor 20 may be in fluid communication with the conduit 160 in order to determine the pressure of the flow fluid that passes through one or more of the conduit 160, the side stream 170, the vibratory flow sensor 5, and/or the density sensor 10. The pressure sensor 20 may transmit the pressure data to the vibratory flow sensor meter electronics 110 and/or the density sensor meter electronics 120 to be used to infer the speed of sound of the flow fluid from the measured pressure. In an embodiment, a pressure sensor 20 may be integrated into one or more of the vibratory flow sensor 5 and the density sensor 10. An embodiment is contemplated where the density sensor 10, itself, infers the SoS of the fluid. In this embodiment, the meter electronics of the density sensor may measure a density of the flow fluid and may infer the pressure of the flow fluid from a measured density sensor 10 stiffness. In this embodiment, the density sensor 10 may transmit the inferred SoS to the vibratory flow sensor meter electronics 110 to be used to correct a mass flowrate measurement of the vibratory flow sensor 5.

Figure 2:
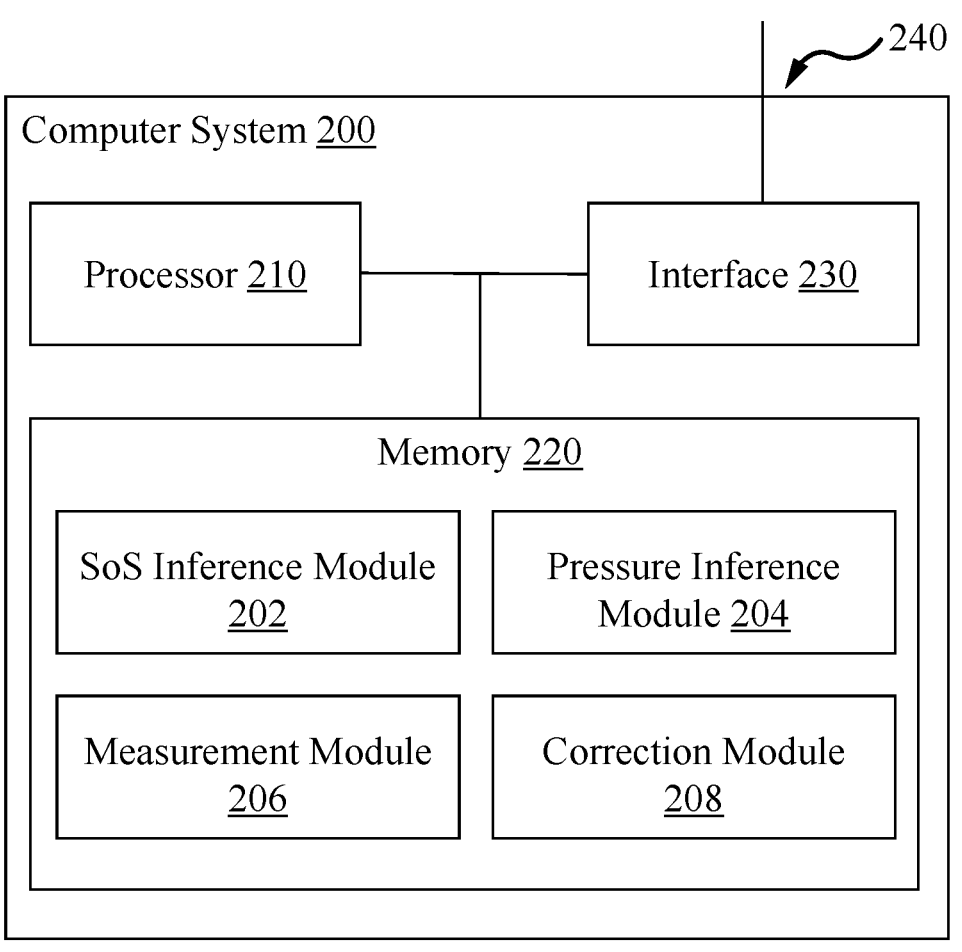
FIG. 2 shows a block diagram of an embodiment of a computer system 200 for inferring and/or applying a speed of sound.

FIG. 2 shows a block diagram of an embodiment of a computer system 200 for inferring and/or applying a speed of sound. In an embodiment, the computer system 200 may be a meter electronics or may have elements that can be components of more than one computer system or meter electronics, for instance, the vibratory flow sensor meter electronics 110, the density sensor meter electronics 120, and/or any electronics associated with the optional pressure sensor 20. It should be appreciated that a number of operations may be accomplished by either or both of the vibratory flow sensor meter electronics 110 and/or the density sensor meter electronics 120, such that each may be different embodiments of the computer system 200 with one or more embodiments of the modules and capabilities expressed with respect to the computer system 200.

In various embodiments, the computer system 200 may be comprised of application specific integrated circuits or may have discrete processor and memory elements, the processor elements for processing commands from and storing data on the memory elements. The computer system 200 may be an isolated physical system, a virtual machine, and/or may be established in a cloud computing environment. The computer system 200 may be configured to accomplish any method steps presented in this description.

The computer system may have a processor 210, a memory 220, an interface 230, and a communicative coupler 240. The memory 220 may store and/or may have integrated circuits representing, for instance, one or more of a SoS inference module 202, a pressure inference module 204, a measurement module 206, and/or a correction module 208. In various embodiments, the computer system 200 may have other computer elements integrated into the stated elements or in addition to or in communication with the stated computer elements, for instance, buses, other communication protocols, and the like.

The processor 210 is a data processing element. The processor 210 may be any element used for processing, such as a central processing unit, application specific integrated circuit, other integrated circuit, an analog controller, graphics processing unit, field programmable gate array, any combination of these or other common processing elements and/or the like. The processor 210 may have cache memory to store processing data. The processor 210 may benefit from the methods in this specification, as the methods may enhance the resolution of calculations and reduce error of those calculations using the inventive structures presented.

The memory 220 is a device for electronic storage. The memory 220 may be any non-transitory storage medium and may include one, some, or all of a hard drive, solid state drive, volatile memory, integrated circuits, a field programmable gate array, random access memory, read-only memory, dynamic random-access memory, erasable programmable read-only memory, electrically erasable programmable read-only memory, cloud storage, cache memory and/or the like. The processor 210 may execute commands from and utilize data stored in the memory 220.

The computer system 200 may be configured to store any data that will be used by one or more of the SoS inference module 202, the pressure inference module 204, the measurement module 206, and/or the correction module 208 and may store historical data for any amount of time representing any parameter received or used by one or more of the SoS inference module 202, the pressure inference module 204, the measurement module 206, and/or the correction module 208 in the memory 220, perhaps with time stamps representing when the data was measured and/or determined. The computer system 200 may also store any data that represents determinations of any intermediates in the memory 220. While the one or more of the SoS inference module 202, the pressure inference module 204, the measurement module 206, and/or the correction module 208 are displayed as four separate and discrete modules, the specification contemplates any number (even one or the four as specified) and variety of modules working in concert to accomplish the methods expressed in this specification.

The SoS inference module 202 is a module that infers speed of sound of a flow fluid. The SoS inference module 202 may use one or more of the relationships expressed in Eqs. (1)-(9) to infer the speed of sound of the flow fluid. In various embodiments, the SoS inference module infers the speed of sound of the flow fluid using one or more of relationships based on an inverse relationship between the SoS and the density of the flow fluid, a direct relationship between the SoS and the pressure of the flow fluid, a direct relationship between the square root of the pressure and the SoS of the flow fluid, an inverse relationship between the SoS and the square root of the density of the flow fluid, a direct relationship between the SoS and the product of the heat capacity ratio (k) and the pressure of the flow fluid, a direct relationship between the SoS and the product of a temperature and/or pressure dependent heat capacity ratio (k(T,P)) and the pressure of the flow fluid, a direct relationship between the SoS and a ratio of the pressure to the density of the flow fluid, a direct relationship between the SoS and a square root of the ratio of the pressure to the density of the flow fluid, and/or a direct relationship between the SoS and a square root of the product of the heat capacity ratio (perhaps a temperature and/or dependent heat capacity ratio) and the ratio of the pressure to the density of the flow fluid.

If the heat capacity ratio is temperature and/or pressure dependent, the temperature and/or pressure dependent heat capacity ratio relationship may be prestored in the SoS inference module 202. The measured temperature that may be used may be measured by any of the vibratory flow sensor 5, the density sensor 10, and/or the pressure sensor 20. Again, the pressure may be inferred from a stiffness of the density sensor 10 by the density sensor 10 using a pressure inference module 204 stored in the density sensor meter electronics 120, or the pressure may be measured by a measurement module 206 stored in the optional pressure sensor 20. Alternative embodiments are contemplated where density and stiffness measurements are determined and/or transmitted as raw data signals to be interpreted by the SoS inference module 202.

In an embodiment in which the speed of sound inference is conducted by the vibratory flow sensor 5, the computer system 200 may be an embodiment of the vibratory flow sensor meter electronics 110, and the SoS inference module 202 may be stored in the vibratory flow sensor meter electronics 110. In this embodiment, the SoS inference module 202 may receive a density measurement from the density sensor 10 and a pressure. The pressure may be a measured pressure and may be received by the vibratory flow sensor meter electronics 110 from the optional pressure sensor 20. Alternatively, the pressure may be an inferred pressure that is inferred from a stiffness measurement of the density sensor 10, using the pressure inference module 204.

In an embodiment in which the speed of sound inference is conducted by the density sensor 10, the computer system 200 may be an embodiment of the density sensor meter electronics 120, and the SoS inference module 202 may be stored in the density sensor meter electronics 120. In this embodiment, the SoS inference module 202 may receive a density measurement from the density sensor 10 and may receive or infer a pressure value. The pressure may be a measured pressure and may be received by the density sensor meter electronics 120 from the optional pressure sensor 20. Alternatively, the pressure may be an inferred pressure that is inferred from a stiffness measurement of the density sensor 10, using the pressure inference module 204.

In another embodiment, a standalone computer system 200 may receive measurements and/or a pressure inference from one or more of the vibratory flow sensor 5, the density sensor 10, and the optional pressure sensor 20. The standalone computer system 200 may have stored the SoS inference module 202, such that the speed of sound of the flow fluid is inferred on the standalone computer system 200.

The pressure inference module 204 is a programming module that infers a pressure value of the flow fluid from a measured value of the stiffness of the density sensor 10. In an embodiment, the pressure inference module 204 may be stored in the density sensor meter electronics 120, such that the density sensor 10 may infer a pressure of the fluid, using the pressure inference module 204, from a measurement of the density sensor 10 stiffness made by the density sensor meter electronics 120. The pressure inference module 204 may use a simple, empirically derived relationship between the inferred pressure and the measured stiffness of the density sensor 10. The relationship may be a simple linear relationship, perhaps one that consists of a simple slope and intercept. For instance, the pressure inference module 204 may use a relationship of the type expressed by Eq. (13).

$$P = A \times \tau + B \qquad (13)$$

In Eq. (13), P is the inferred pressure, A and B are coefficients (either constant or temperature dependent), and τ is the measured density sensor 10 stiffness.

In an alternative embodiment, the pressure inference module 204 may be stored in the vibratory flow sensor meter electronics 110. In this embodiment, the pressure inference module 204 may receive a measured stiffness of the density sensor 10 from the density sensor meter electronics 120 to be used in the density inference. In other embodiments, the pressure inference module 204 may determine the pressure from measured or transmitted raw data that represents the stiffness measurement of the density sensor 10 to be used in the pressure inference. In embodiments in which an optional pressure sensor 20 is used to measure pressure for inferring the speed of sound of the flow fluid, the pressure inference module 204 may not be necessary and may not be present in any of the computer system 200, the vibratory flow sensor meter electronics 110, and the density sensor meter electronics 120.

The measurement module 206 is a module that determines measurement values. Each of the vibratory flow sensor meter electronics 110, the density sensor meter electronics 120, and the pressure sensor 20 may have different variations of a measurement module 206. For instance, in an embodiment, the vibratory flow sensor meter electronics 110 measurement module 206 may be configured to take measurements of mass flowrate. The density sensor meter electronics 120 may have a measurement module 206 that measures one or more of a measured density of the flow fluid and a measured stiffness of the density sensor 10. The measured stiffness of the density sensor 10 may be stored if the pressure being used in the inferential speed of sound relationship is an inferred pressure. The optional pressure sensor 20 may have an embodiment of the measurement module 206 stored in it electronics that is configured to measure a pressure value of the flow fluid, perhaps to the exclusion of other measurements.

The correction module 208 is a programming module that corrects vibratory flow sensor 5 measurements for errors due to speed of sound effects of the flow fluid. In an embodiment, the correction module 208, is stored in the vibratory flow sensor meter electronics 110. The correction module 208 can use an inferred speed of sound to correct a mass flowrate measurement of the vibratory flow sensor 5. An example of a mass flowrate correction equation that corrects for speed of sound effects, using a speed of sound as a term, can be expressed as a relationship of the kind shown in Eqs. (10)-(12). The correction module 208 may alternatively use existing mass flowrate relationships that correct for speed of sound effects. In an embodiment in which the inferring of the inferred speed of sound of the flow fluid is conducted by the vibratory flow sensor meter electronics 110, the correction module 208 may receive the inferred speed of sound of the flow fluid from vibratory flow sensor meter electronics 110, itself. In an embodiment in which the inferring of the inferred speed of sound of the flow fluid is conducted by the density sensor meter electronics 120, the correction module 208 may receive the inferred speed of sound of the flow fluid from the density sensor meter electronics 120 via the vibratory flow sensor meter electronics 110.

In an embodiment in which the vibratory flow sensor meter electronics 110 conducts the speed of sound inference, the vibratory flow sensor meter electronics 110 may have the SoS inference module 202 and may receive measurements and/or inferences of one or more of a measured temperature of the flow fluid, a measured pressure of the flow fluid, a measured density of the flow fluid, and density sensor 10 stiffness. In these embodiments, the flow sensor meter electronics 110 may determine a corrected mass flowrate based on one or more of measurements of phase difference, time delay, and/or temperature taken by a measurement module 206 stored in the vibratory flow sensor meter electronics 110, or the temperature measurement may be measured alternatively by a measurement module 206 in the density sensor meter electronics 120 or the pressure sensor 20 (using their respective temperature sensors). In this embodiment, the density sensor 10 may have a measurement module 206 that is configured to measure the density of the flow fluid. In this embodiment, the correction module 208 may take the inferred speed of sound of the flow fluid and apply it to a correction of the mass flowrate determined by the vibratory flow sensor meter electronics 110. In this embodiment, if the pressure used to determine the inferred speed of sound of the flow fluid is an inferred pressure, the inferred pressure may be inferred by a pressure inference module 204 of the density sensor 10. In an alternative embodiment in which an inferred pressure is used, the density sensor 10 measurement module 206 may measure a density sensor 10 stiffness and transmit the stiffness value to the vibratory flow sensor meter electronics 110 for the vibratory flow sensor meter electronics 110 to determine the inferred pressure using a pressure inference module 204 stored in the vibratory flow sensor meter electronics 110. In an embodiment where a measured pressure is used, the inferred pressure may be superfluous such that no inference of pressure from density sensor 10 stiffness is made.

In an alternative embodiment in which the density sensor 10 performs the inference of the speed of sound of the flow fluid, the SoS inference module 202 may be stored in the density sensor meter electronics 120. This SoS may be transmitted from the density sensor meter electronics 120 to the vibratory flow sensor meter electronics 110 to be used by the vibratory flow sensor meter electronics 110 in a correction module 208 stored in the vibratory flow sensor meter electronics 110 to correct a mass flowrate measurement. That corrected mass flowrate measurement may also be based on phase difference or time delay data determined by a measurement module 206 of the vibratory flow sensor meter electronics 110. In this embodiment, the density sensor meter electronics 120 may have a measurement module 206 that measures a measured density of the flow fluid. The temperature measurement can be provided by a measurement module stored in one of the density sensor meter electronics 120, vibratory flow sensor meter electronics 110, and the optional pressure sensor 20. The pressure used to infer the speed of sound of the flow fluid may be inferred by the density sensor meter electronics 120 using a pressure inference module 204. In an alternative embodiment, the pressure used is a measured pressure provided to the density sensor meter electronics 120 by the optional pressure sensor 20.

The capabilities of the SoS inference module 202, the pressure inference module 204, the measurement module 206, and/or the correction module 208 are contemplated and reflect the methods that are performed in the flowcharts presented. All methods in this specification are contemplated with respect to each flowchart and orders specified, other potential orders, or, when it is specified that the order does not matter, inform the flowcharts, but all methods and capabilities of the SoS inference module 202, the pressure inference module 204, the measurement module 206, and/or the correction module 208 are contemplated for the purposes of any method and/or apparatus claims in this specification. Also, given that the systems and methods of this specification may require more than one sensor (for instance, one or more of the vibratory flow sensor 5, the density sensor 10, and the optional pressure sensor 20), each sensor may have its own embodiment of the computer system 200 with each sensor having its own embodiments of one or more of the SoS inference module 202, the pressure inference module 204, the measurement module 206, and/or the correction module 208, as necessary. Any sensor that conducts the speed of sound inference may have an embodiment of the SoS inference module 202. If the pressure used in the inferential relationship to determine the speed of sound is an inferred pressure, one or more of the vibratory sensor 5 and the density sensor 10 may have its own embodiment of the pressure inference module 204. Each of the sensors that take measurements may have its own embodiment of the measurement module 206 (with capabilities to take the measurements taken by each corresponding sensor). The correction module 208 is most likely stored in the vibratory sensor 5, but embodiments are contemplated in which individual embodiments of the correction module 208 may be stored in the other sensors.

Various embodiments of the computer system 200 are envisioned, and certain elements of the computer system 200 may belong to different hardware elements, for instance, one or more of the vibratory flow sensor meter electronics 110, the density sensor meter electronics 120, and the optional pressure sensor 20. In examples where a measured pressure is used to infer the speed of sound of the flow fluid, the optional pressure sensor 20 may have a measurement module 206 that measures the pressure of the flow fluid and transmits the measured pressure to whichever computer system conducts the inference of the speed of sound of the flow fluid (for instance, transmits the pressure to one or more of the vibratory flow sensor meter electronics 110 and the density sensor meter electronics 120).

Also, in embodiments where the computer system 200 is a meter electronics 110, the meter electronics 110 may comprise a number of communicatively coupled elements. The hardware that interacts to form the cohesive computer system 200 that is the meter electronics 110 may be of different components, for instance, a traditional meter electronics array communicatively coupled to a corresponding and/or compatible transmitter. In an embodiment, the meter electronics 110 may have its processor 210 in the integral meter electronics elements of the meter and at least some elements of the memory 220 in the transmitter.

The orders in which certain modules execute steps largely depends on the necessary relationships disclosed. For instance, if the inferential relationship to infer the speed of sound of the fluid requires measurements and/or inferences of one or more of density, pressure, sensor stiffness, and temperature, those quantities will have to be measured or inferred before the speed of sound is inferred using those quantities. Also, if a mass flowrate is to be corrected by an inferred speed of sound, the speed of sound must first be inferred before the mass flowrate can be corrected based on the inferred speed of sound. Therefore, no order of steps or usages of modules is truly necessary, except to the extent that the underlying procedures require that one step be taken before the next. For instance, the measurements taken can mostly be taken in any order. The inferences must only be sequential to the extent that such values are required as inputs to a next step.

The interface 230 is an input/output device used to communicatively couple the data computer system 200 to external compute elements. The interface 230 is capable of connecting the computer system 200 to external elements, using known technologies, for instance, universal serial bus, Prolink, serial communication, serial advanced technology attachments, HPC type connections, Gigabit Ethernet, infiniband, and/or the like. The interface 230 may have a communicative coupler 240. The communicative coupler 240 is used to couple the computer system 200 with components external of the computer system 200, for instance, with one or more of external compute devices, the vibratory flow sensor 5, the density sensor 10, and the optional pressure sensor 20.

Flowcharts

FIGS. 3-7 show flowcharts of embodiments of methods for inferring a speed of sound and embodiments of methods of using the inferred speed of sound to correct flow measurements. The methods disclosed in the flowcharts are non-exhaustive and merely demonstrate potential embodiments of steps and orders. The methods must be construed in the context of the entire specification, including elements disclosed in descriptions of FIGS. 1 and 2, the computer system(s) 200 disclosed in FIG. 2, and/or the SoS inference module 202.

FIG. 3 shows a flowchart of an embodiment of a method 300 for inferring an inferred speed of sound of a flow fluid. The vibratory flow sensor 5, density sensor 10, optional pressure sensor 20, computer system 200, vibratory flow sensor meter electronics 110, density sensor meter electronics 120, SoS inference module 202, pressure inference module 204, measurement module 206, and correction module 208 referred to in method 300 may be the vibratory flow sensor 5, density sensor 10, optional pressure sensor 20, computer system 200, vibratory flow sensor meter electronics 110, density sensor meter electronics 120, SoS inference module 202, pressure inference module 204, measurement module 206, and correction module 208 as disclosed in FIGS. 1 and 2, although any suitable vibratory flow sensor 5, density sensor 10, optional pressure sensor 20, computer system 200, vibratory flow sensor meter electronics 110, density sensor meter electronics 120, SoS inference module 202, pressure inference module 204, measurement module 206, and correction module 208 may be employed in alternative embodiments. All methods for accomplishing these steps disclosed in this specification are contemplated. Also, all of the vibratory flow sensor 5, density sensor 10, and optional pressure sensor 20 (if relevant) are in fluid communication with one another and receive a flow fluid, the inferred speed of sound referred to in method 300 being the inferred speed of sound of the flow fluid.

Step 302 is measuring, by one or more measurement modules 206, measured input parameters. Measured input parameters may include, for instance, one or more of density, temperature, density sensor 10 stiffness, and pressure. The measuring need not include all of the stated measured input parameters. For instance, in an embodiment in which the pressure used in the speed of sound inference is a measured pressure, the pressure is a measured input parameter (perhaps taken by an optional pressure sensor 20), and the density sensor 10 stiffness may be superfluous to a SoS inference. In an embodiment in which the pressure is inferred, the density sensor 10 stiffness may be measured to infer a pressure, and the pressure may not need to be measured (perhaps making the optional pressure sensor 20 unnecessary). Also, the measuring of temperature may be conducted by a measurement module 206 of any of the vibratory flow sensor 5, density sensor 10, and optional pressure sensor 20. All of the capabilities of the different embodiments of the measurement module 206 disclosed in this specification are contemplated to accomplish this step.

Step 304 is optionally, inferring, by the pressure inference module 204, an inferred pressure. As stated, the inferred speed of sound of the flow fluid may be inferred using an inferred pressure instead of a measured pressure. The density sensor 10 may measure stiffness of the density sensor 10. One of the density sensor 10 and the vibratory sensor 5 (whichever has the pressure inference module 204 in its meter electronics) may use the measured stiffness to infer an inferred pressure. All of the capabilities of the different embodiments of the pressure inference module 204 disclosed in this specification are contemplated to accomplish this step.

Step 306 is inferring, by the SoS inference module 202, an inferred speed of sound of the flow fluid. The SoS inference module may infer the inferred speed of sound from one or more of the measured input parameters and inferred pressure. The SoS inference module 202 may use any of its capabilities and may use any of the relationships stated, for instance, the relationships stated as between the inferred speed of sound and the measured input parameters (and the inferred pressure, if in a relevant embodiment) and the relationships expressed by Eqs. (1)-(9). As disclosed in the specification, the SoS inference module 202 may be an element of one of the vibratory flow sensor meter electronics 110 and the density sensor meter electronics 120, whichever meter electronics is expected to infer the inferred speed of sound. In an alternative embodiment, the SoS inference module 202 may be stored in a standalone computer system that receives relevant measurements and/or inferences to infer the speed of sound on the standalone computer system 200. All of the capabilities of the different embodiments of the SoS inference module 202 disclosed in this specification are contemplated to accomplish this step.

In an embodiment, each of the steps of the method shown in FIG. 3 is a distinct step. In another embodiment, although depicted as distinct steps in FIG. 3, steps 302-306 may not be distinct steps. In other embodiments, the method shown in FIG. 3 may not have all of the above steps and/or may have other steps in addition to or instead of those listed above. The steps of the method shown in FIG. 3 may be performed in another order. Subsets of the steps listed above as part of the method shown in FIG. 3 may be used to form their own method. The steps of method 300 may be repeated in any combination and order any number of times, for instance, continuously looping in order to provide consistent and/or continuous flow fluid speed of sound inferences.

FIG. 4 shows a flowchart of an embodiment of a method 400 for inferring an inferred speed of sound of a flow fluid. The vibratory flow sensor 5, density sensor 10, optional pressure sensor 20, computer system 200, vibratory flow sensor meter electronics 110, density sensor meter electronics 120, SoS inference module 202, pressure inference module 204, measurement module 206, and correction module 208 referred to in method 400 may be the vibratory flow sensor 5, density sensor 10, optional pressure sensor 20, computer system 200, vibratory flow sensor meter electronics 110, density sensor meter electronics 120, SoS inference module 202, pressure inference module 204, measurement module 206, and correction module 208 as disclosed in FIGS. 1 and 2, although any suitable vibratory flow sensor 5, density sensor 10, optional pressure sensor 20, computer system 200, vibratory flow sensor meter electronics 110, density sensor meter electronics 120, SoS inference module 202, pressure inference module 204, measurement module 206, and correction module 208 may be employed in alternative embodiments. All methods for accomplishing these steps disclosed in this specification are contemplated. Also, all of the vibratory flow sensor 5, density sensor 10, and optional pressure sensor 20 (if relevant) are in fluid communication with one another and receive a flow fluid, the inferred speed of sound being the inferred speed of sound of the flow fluid.

Step 402 is inferring, by the SoS inference module 202, an inferred speed of sound of the flow fluid based on an inferential relationship between a measured density of the flow fluid and the inferred speed of sound of the flow fluid. The SoS inference module may receive and determine the inferred speed of sound from one or more of the measured input parameters and inferred pressure. The SoS inference module 202 may use any of its capabilities and may use any of the relationships stated, for instance, the relationships stated as between the inferred speed of sound and the measured input parameters (and the inferred pressure, if in a relevant embodiment) and the relationships expressed by Eqs. (1)-(9). As disclosed in the specification, the SoS inference module 202 may be an element of one of the vibratory flow sensor meter electronics 110 and the density sensor meter electronics 120, whichever meter electronics is expected to infer the inferred speed of sound. In an alternative embodiment, the SoS inference module 202 may be stored in a computer system 200 that is a standalone computer system that receives relevant measurements and/or inferences to infer the speed of sound on the standalone computer system. All of the capabilities of the different embodiments of the SoS inference module 202 disclosed in this specification are contemplated to accomplish this step. Step 402 may be an embodiment of step 306.

In an embodiment, sub steps of the step listed above as part of the method shown in FIG. 4 may be used to form their own method. The step of method 400 may be repeated any number of times, for instance, continuously looping in order to provide consistent and/or continuous flow fluid speed of sound inferences.

FIG. 5 shows a flowchart of an embodiment of a method 500 for inferring an inferred speed of sound of a flow fluid in a density sensor 10. The vibratory flow sensor 5, density sensor 10, optional pressure sensor 20, computer system 200, vibratory flow sensor meter electronics 110, density sensor meter electronics 120, SoS inference module 202, pressure inference module 204, measurement module 206, and correction module 208 referred to in method 500 may be the vibratory flow sensor 5, density sensor 10, optional pressure sensor 20, computer system 200, vibratory flow sensor meter electronics 110, density sensor meter electronics 120, SoS inference module 202, pressure inference module 204, measurement module 206, and correction module 208 as disclosed in FIGS. 1 and 2, although any suitable vibratory flow sensor 5, density sensor 10, optional pressure sensor 20, computer system 200, vibratory flow sensor meter electronics 110, density sensor meter electronics 120, SoS inference module 202, pressure inference module 204, measurement module 206, and correction module 208 may be employed in alternative embodiments. All methods for accomplishing these steps disclosed in this specification are contemplated. Also, all of the vibratory flow sensor 5, density sensor 10, and optional pressure sensor 20 (if relevant) are in fluid communication with one another and receive a flow fluid, the inferred speed of sound being the inferred speed of sound of the flow fluid.

Step 502 is measuring, by a measurement module 206, measured input parameters of the density sensor 10. Measured input parameters of the density sensor 10 may include, for instance, one or more of density, temperature, and density sensor 10 stiffness. In some embodiments, the measuring need not necessarily include all of the stated measured input parameters. For instance, in an embodiment in which the pressure used in the speed of sound inference is a measured pressure, the density sensor 10 stiffness may be superfluous and not measured at all. In an embodiment in which the pressure is inferred, the density sensor 10 stiffness may be measured to infer a pressure. Also, the measuring of temperature may be conducted by a measurement module 206 of any of the vibratory flow sensor 5, density sensor 10, and the optional pressure sensor 20. If the measured temperature to be used in the speed of sound inference is measured in a sensor other than the density sensor 10, the density sensor 10 may receive the measured temperature from the sensor other than the density sensor. All of the capabilities of the different embodiments of the measurement module 206 associated with the density sensor 10 disclosed in this specification are contemplated to accomplish this step. Step 502 may be an embodiment of step 302.

Step 504 is optionally, inferring, by the pressure inference module 204, an inferred pressure. As stated, the inferred speed of sound of the flow fluid may be inferred using an inferred pressure instead of a measured pressure. The density sensor 10 may measure stiffness of the density sensor 10. The density sensor 10 may use the measured stiffness to infer an inferred pressure. All of the capabilities of the different embodiments of the pressure inference module 204 associated with the density sensor 10 disclosed in this specification are contemplated to accomplish this step. Step 504 may be an embodiment of step 304.

Step 506 is optionally, receiving, by the density sensor meter electronics 120, a measured pressure from the optional pressure sensor 20. In this embodiment, a pressure is measured, not inferred. In an embodiment, steps 504 and 506 may be alternative steps, such that one of a measured pressure and an inferred pressure is used to infer the speed of sound of the flow fluid.

Step 508 is inferring, by the SoS inference module 202, an inferred speed of sound of the flow fluid. The SoS inference module 202 may be stored in a density sensor meter electronics 120. The SoS inference module may infer the inferred speed of sound from one or more of the measured input parameters, the inferred pressure, and any received parameters. The SoS inference module 202 may use any of its capabilities and may use any of the relationships stated, for instance, the relationships stated as between the inferred speed of sound and the measured input parameters (and/or the inferred pressure, if in a relevant embodiment) and the relationships expressed by Eqs. (1)-(9). All of the capabilities of the different embodiments of the SoS inference module 202 associated with the density sensor 10 disclosed in this specification are contemplated to accomplish this step. Step 508 may be an embodiment of step 306.

In an embodiment, each of the steps of the method shown in FIG. 5 is a distinct step. In another embodiment, although depicted as distinct steps in FIG. 5, steps 502-508 may not be distinct steps. In other embodiments, the method shown in FIG. 5 may not have all of the above steps and/or may have other steps in addition to or instead of those listed above. The steps of the method shown in FIG. 5 may be performed in another order. Subsets of the steps listed above as part of the method shown in FIG. 5 may be used to form their own method. The steps of method 500 may be repeated in any combination and order any number of times, for instance, continuously looping in order to provide consistent and/or continuous flow fluid speed of sound inferences.

FIG. 6 shows a flowchart of an embodiment of a method 600 for inferring an inferred speed of sound of a flow fluid in a vibratory flow sensor 5. The vibratory flow sensor 5, density sensor 10, optional pressure sensor 20, computer system 200, vibratory flow sensor meter electronics 110, density sensor meter electronics 120, SoS inference module 202, pressure inference module 204, measurement module 206, and correction module 208 referred to in method 600 may be the vibratory flow sensor 5, density sensor 10, optional pressure sensor 20, computer system 200, vibratory flow sensor meter electronics 110, density sensor meter electronics 120, SoS inference module 202, pressure inference module 204, measurement module 206, and correction module 208 as disclosed in FIGS. 1 and 2, although any suitable vibratory flow sensor 5, density sensor 10, optional pressure sensor 20, computer system 200, vibratory flow sensor meter electronics 110, density sensor meter electronics 120, SoS inference module 202, pressure inference module 204, measurement module 206, and correction module 208 may be employed in alternative embodiments. All methods for accomplishing these steps disclosed in this specification are contemplated. Also, all of the vibratory flow sensor 5, density sensor 10, and optional pressure sensor 20 (if relevant) are in fluid communication with one another and receive a flow fluid, the inferred speed of sound being the inferred speed of sound of the flow fluid.

Step 602 is measuring, by a measurement module 206, measured input parameters of the vibratory flow sensor 5. Measured input parameters of the vibratory flow sensor 5 may include, for instance, one or more of density and temperature. The density of the vibratory flow sensor 5 may be too susceptible to speed of sound effects to be used in the inference of the speed of sound of the flow fluid, so another density measurement may be required, perhaps a density measurement by the density sensor 10. All of the capabilities of the different embodiments of the measurement module 206 with respect to the vibratory flow sensor 5 disclosed in this specification are contemplated to accomplish this step. Step 602 may be an embodiment of step 302.

Step 604 is optionally, inferring, by the pressure inference module 204, an inferred pressure. As stated, the inferred speed of sound of the flow fluid may be inferred using an inferred pressure instead of a measured pressure. The density sensor 10 may measure stiffness of the density sensor 10. In an embodiment, the density sensor 10 may use the measured stiffness to infer an inferred pressure in the density sensor meter electronics 120, the pressure inference module 204 being stored in the density sensor meter electronics 120 in this embodiment. In an alternative embodiment, the density sensor 10 may measure a density sensor 10 stiffness and transmit the density sensor 10 stiffness to the vibratory flow sensor meter electronics 110, such that a pressure inference module 204 stored in the vibratory flow sensor meter electronics 110 infers a pressure to be used in the speed of sound inference. All of the capabilities of the different embodiments of the pressure inference module 204 disclosed in this specification are contemplated to accomplish this step. Step 604 may be an embodiment of step 304.

Step 606 is optionally, receiving, by the vibratory flow sensor meter electronics 110 a measured pressure from the optional pressure sensor 20. In this embodiment, a pressure is measured, not inferred. In an embodiment, steps 604 and 606 may be alternative steps.

Step 608 is optionally, receiving, by the vibratory flow sensor meter electronics 110, a density measured by the density sensor 10. The density sensor 10 may be less susceptible to speed of sound effects than the vibratory flow sensor 5. If that is the case, it may be better to use the density measurement of the flow fluid provided by the measurement module 206 of the density sensor 10.

Step 610 is inferring, by the SoS inference module 202, an inferred speed of sound of the flow fluid. The SoS inference module 202 may be stored in vibratory flow sensor meter electronics 110. The SoS inference module may infer the inferred speed of sound from one or more of the measured input parameters, the inferred pressure, and any received measurements. The SoS inference module 202 may use any of its capabilities and may use any of the relationships stated, for instance, the relationships stated as between the inferred speed of sound and the measured input parameters (and/or the inferred pressure, if in a relevant embodiment) and the relationships expressed by Eqs. (1)-(9). All of the capabilities of the different embodiments of the SoS inference module 202 disclosed in this specification are contemplated to accomplish this step. Step 610 may be an embodiment of step 306.

In an embodiment, each of the steps of the method shown in FIG. 6 is a distinct step. In another embodiment, although depicted as distinct steps in FIG. 6, steps 602-610 may not be distinct steps. In other embodiments, the method shown in FIG. 6 may not have all of the above steps and/or may have other steps in addition to or instead of those listed above. The steps of the method shown in FIG. 6 may be performed in another order. Subsets of the steps listed above as part of the method shown in FIG. 6 may be used to form their own method. The steps of method 600 may be repeated in any combination and order any number of times, for instance, continuously looping in order to provide consistent and/or continuous flow fluid speed of sound inferences.

FIG. 7 shows a flowchart of an embodiment of a method 700 for correcting a flow measurement using an inferred speed of sound. The vibratory flow sensor 5, density sensor 10, vibratory flow sensor meter electronics 110, and correction module 208 referred to in method 700 may be the vibratory flow sensor 5, density sensor 10, vibratory flow sensor meter electronics 110, and correction module 208 as disclosed in FIGS. 1 and 2, although any suitable the vibratory flow sensor 5, density sensor 10, vibratory flow sensor meter electronics 110, and correction module 208 may be employed in alternative embodiments. All methods for accomplishing these steps disclosed in this specification are contemplated. Also, all of the vibratory flow sensor 5, density sensor 10, and optional pressure sensor 20 (if relevant) are in fluid communication with one another and receive a flow fluid, the inferred speed of sound being the inferred speed of sound of the flow fluid and the flow measurement being a flow measurement of the flow fluid.

Step 702 is receiving, by the correction module 208, the inferred speed of sound of the flow fluid. In an embodiment in which the speed of sound inference is conducted by a SoS inference module 202 stored in the vibratory flow sensor meter electronics 110, the inferred speed of sound may be received from the SoS inference module 202 stored in the vibratory flow sensor meter electronics 110. In an embodiment in which the speed of sound inference is conducted by a SoS inference module 202 stored in the density sensor meter electronics 120, the inferred speed of sound may be received from the SoS inference module 202 stored in the density sensor meter electronics 120.

Step 704 is measuring, by a measurement module 206, a phase difference or time delay. The phase difference or time delay may represent Coriolis forces acting on the flow fluid, such that a phase difference or time delay between oscillations of upstream and downstream sensors may represent a flow parameter, for instance, mass flowrate. The manner in which time delays and/or phase differences are measured in vibratory flow sensors is well-established in the art and its discussion is truncated for brevity.

Step 706 is determining, by the correction module 208, a corrected mass flow parameter based on the inferred speed of sound of the flow fluid. The mass flow parameter may be a mass flowrate. The mass flowrate may be determined and corrected using any determination and correction relationships, for instance, the relationships expressed by Eqs. (10)-(12).

In an embodiment, each of the steps of the method shown in FIG. 7 is a distinct step. In another embodiment, although depicted as distinct steps in FIG. 7, steps 702-706 may not be distinct steps. In other embodiments, the method shown in FIG. 7 may not have all of the above steps and/or may have other steps in addition to or instead of those listed above. The steps of the method shown in FIG. 7 may be performed in another order. Subsets of the steps listed above as part of the method shown in FIG. 7 may be used to form their own method. The steps of method 700 may be repeated in any combination and order any number of times, for instance, continuously looping in order to provide consistent and/or continuous mass flowrates corrected for speed of sound effects.

Graphs

FIGS. 8 and 9 show graphs representing elements of the speed of sound inference and subsequent correction of the inferred mass flowrate described in the specification.

FIG. 8 shows a graph 800 showing an embodiment of the relationship between heat capacity ratio with both of pressure and temperature for ethylene. Graph 800 has a first data series 802 representing ethylene at 20° C., a second data series 804 representing ethylene at 40° C., an ordinate 810 representing a magnitude of heat capacity ratio, and an abscissa 820 representing pressure in bars. As can be seen, the data show significant differences in heat capacity with changes in temperature and/or pressure. This is why using a temperature and/or pressure dependent heat capacity in an inferential relationship to infer a speed of sound of a flow fluid may improve accuracy of the inference considerably.

FIG. 9 shows a graph 900 showing an embodiment of the relationship between mass flowrate error percent due to speed of sound effects and both of pressure and temperature for ethylene flowing through a CMF400 mass flowmeter. It should be appreciated that the CMF400 is only an exemplary vibratory flow sensor 5 used for this specific demonstration of the inventive concept and that the described features of the invention may be applied to any vibratory flow sensor 5. The graph 900 has a first data series 902 representing ethylene at 60° F., a second data series 904 representing ethylene at 80° F., a third data series 906 representing ethylene at 90° F., an ordinate 910 representing a magnitude of mass flow error percent due to speed of sound effects, and an abscissa 920 representing pressure in pounds per square inch absolute. It can be seen from this that mass flowrate percent error due to speed of sound effects varies significantly with temperature and pressure. Using a temperature and/or pressure dependent heat capacity ratio and/or a pressure dependent inferred speed of sound can account for this, and significantly reduce mass flowrate error due to speed of sound effects.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description. When specific numbers representing parameter values are specified, the ranges between all of those numbers as well as ranges above and ranges below those numbers are contemplated and disclosed.

Thus, although specific embodiments are described herein for illustrative purposes, various equivalent modifications are possible within the scope of the present description, as those skilled in the relevant art will recognize. The teachings provided herein can be applied to other methods and apparatuses for inferring a speed of sound and other methods and apparatuses for using the speed of sound to correct flow measurements and not just to the embodiments described above and shown in the accompanying figures. Accordingly, the scope of the embodiments described above should be determined from the following claims.

We claim:

1. A method for inferring an inferred speed of sound of a flow fluid, the method being conducted by a computer system (200) having a processor (210) and a memory (220), the processor (210) configured to execute instructions from the memory (220) and store data in the memory (220), the memory (220) having a SoS inference module (202), the method comprising:

providing a vibratory flow sensor (5) fluidly coupled to a conduit (160) through which the flow fluid flows and configured to determine a flow measurement of the flow fluid;

providing a density sensor (10) fluidly coupled to the conduit, the density sensor being substantially immune from speed of sound effects of the flow fluid, and having at least one of: 1) a smaller diameter than the vibratory flow sensor, 2) a lower vibrating frequency than the vibratory flow sensor, and 3) a predetermined distance threshold with respect to the vibratory flow sensor;

measuring, by the density sensor, the density of the flow fluid;

inferring, by the SoS inference module (202), the inferred speed of sound of the flow fluid based on an inferential relationship between a measured density and a heat capacity ratio of the flow fluid and the inferred speed of sound of the flow fluid; and transmitting, by the density sensor, the inferred speed of sound of the fluid to the vibratory flow sensor in order to correct the flow measurement and improve accuracy in the vibratory flow sensor.

2. A method as claimed in claim 1, wherein the inferential relationship between the inferred speed of sound of the flow fluid and the density of the flow fluid is an inverse relationship between the inferred speed of sound of the flow fluid and the square root of the measured density of the flow fluid.

3. A method as claimed in claim 2, wherein the inferential relationship between the inferred speed of sound of the flow fluid and the density of the flow fluid further accounts for a pressure of the flow fluid, wherein the pressure of the flow fluid is one or more of a measured pressure measured by a pressure sensor (20) and a pressure inferred from a density sensor (10) stiffness determination.

4. A method as claimed in claim 3, wherein the inferential relationship is based on a relationship between the inferred speed of sound of the flow fluid and a square root term, the square root term having a square root of a product of the heat capacity ratio and the pressure, divided by the square root of the measured density.

5. A method as claimed in claim 4, wherein the heat capacity ratio is associated with one or more of the flow fluid and a class of flow fluids of which the flow fluid is a member and wherein the heat capacity ratio is one or more of temperature dependent and pressure dependent, such that the heat capacity ratio is determined based on a corresponding predetermined relationship between the heat capacity ratio and one or more of the measured temperature and the pressure.

6. A method as claimed in claim 3, wherein the computer system (200) is a vibratory flow sensor meter electronics (110) of the vibratory flow sensor (5), the method further comprising:

receiving, by the computer system (200), the measured density from the density sensor (10);

receiving, by the computer system (200), the pressure of the flow fluid; and determining, by the computer system (200), a corrected mass flowrate, based on the inferred speed of sound of the flow fluid.

7. A method as claimed in claim 1, wherein the computer system (200) is a density sensor meter electronics (120) of the density sensor (10).

8. A method as claimed in claim 7, further comprising, if the inferential relationship between a measured density of the flow fluid and the inferred speed of sound of the flow fluid accounts for a flow fluid pressure, inferring, by the density sensor meter electronics (120), an inferred flow fluid pressure based on a measured stiffness of elements of the density sensor (10) determined by the density sensor (10).

9. A method as claimed in claim 7, wherein the vibratory flow sensor (5) one or more of:

vibrates vibratory sensor (5) vibratory elements at a frequency that is greater than or equal to 300 hertz; and has an inner diameter that is greater than or equal to two inches, and wherein the density sensor (10) one or more of:

vibrates density sensor (10) vibratory elements at a frequency that is less than 300 hertz; and has an inner diameter that is less than two inches.

10. A method as claimed in claim 1, wherein the flow fluid is in a supercritical state and comprises one or more of ethylene, ethane, carbon dioxide, and argon.

11. A system for inferring an inferred speed of sound of a flow fluid, the system comprising:

a vibratory flow sensor (5) fluidly coupled to a conduit (160) through which the flow fluid flows and configured to determine a flow measurement of the flow fluid;

a density sensor (10) fluidly coupled to the conduit, the density sensor being substantially immune from speed of sound effects of the flow fluid, and having at least one of: 1) a smaller diameter than the vibratory flow sensor, 2) a lower vibrating frequency than the vibratory flow sensor, and 3) a predetermined distance threshold with respect to the vibratory flow sensor; and a computer system (200) having a processor (210) and a memory (220), the processor (210) configured to execute instructions from the memory (220) and store data in the memory (220), the memory (220) having a SoS inference module (202), the computer system (200) configured to:

measure, by the density sensor, the density of the flow fluid;

infer, by the SoS inference module (202), the inferred speed of sound of the flow fluid based on an inferential relationship between a measured density and heat capacity ratio of the flow fluid and the inferred speed of sound of the flow fluid; and transmit, by the density sensor, the inferred speed of sound of the fluid to the vibratory flow sensor in order to correct the flow measurement and improve accuracy in the vibratory flow sensor.

12. A system as claimed in claim 11, wherein the inferential relationship between the inferred speed of sound of the flow fluid and the density of the flow fluid is an inverse relationship between the inferred speed of sound of the flow fluid and the square root of the measured density of the flow fluid.

13. A system as claimed in claim 12, wherein the inferential relationship between the inferred speed of sound of the flow fluid and the density of the flow fluid further accounts for a pressure of the flow fluid, wherein the pressure of the flow fluid is one or more of a measured pressure measured by a pressure sensor (20) and a pressure inferred from a density sensor (10) stiffness determination.

14. A system as claimed in claim 13, wherein the inferential relationship is based on a relationship between the inferred speed of sound of the flow fluid and a square root term, the square root term having a square root of a product of the heat capacity ratio and the pressure, divided by the square root of the measured density.

15. A system as claimed in claim 14, wherein the heat capacity ratio is associated with one or more of the flow fluid and a class of flow fluids of which the flow fluid is a member and wherein the heat capacity ratio is one or more of temperature dependent and pressure dependent, such that the heat capacity ratio is determined based on a corresponding predetermined relationship between the heat capacity ratio and one or more of the measured temperature and the pressure.

16. A system as claimed in claim 13, wherein the computer system (200) is a vibratory flow sensor meter electronics (110) of the vibratory flow sensor (5), the computer system (200) further configured to:

receive the measured density from the density sensor (10);
 receive the pressure of the flow fluid; and
 determine a corrected mass flowrate based on the inferred speed of sound of the flow fluid.

17. A system as claimed in claim 11, wherein the computer system (200) is a density sensor meter electronics (120) of the density sensor (10).

18. A system as claimed in claim 17, wherein if the inferential relationship between a measured density of the flow fluid and the inferred speed of sound of the flow fluid accounts for a flow fluid pressure, the density sensor meter electronics (120) is configured to infer an inferred flow fluid pressure based on a measured stiffness of elements of the density sensor (10) determined by the density sensor (10).

19. A system as claimed in claim 16, wherein the vibratory flow sensor (5) one or more of:

vibrates vibratory sensor (5) vibratory elements at a frequency that is greater than or equal to 300 hertz; and
 has an inner diameter that is greater than or equal to two inches, and wherein the density sensor (10) one or more of:
 vibrates density sensor (10) vibratory elements at a frequency that is less than 300 hertz; and
 has an inner diameter that is less than two inches.

20. A system as claimed in claim 11, wherein the flow fluid is in a supercritical state and comprises one or more of ethylene, ethane, carbon dioxide, and argon.

\* \* \* \* \*